United States Patent
Park et al.

(10) Patent No.: US 11,005,629 B2
(45) Date of Patent: May 11, 2021

(54) METHOD FOR TRANSRECEIVING CHANNEL STATE INFORMATION-REFERENCE SIGNAL IN WIRELESS COMMUNICATION SYSTEM AND APPARATUS FOR SAME

(71) Applicant: LG ELECTRONICS INC., Seoul (KR)

(72) Inventors: Haewook Park, Seoul (KR); Jiwon Kang, Seoul (KR); Jonghyun Park, Seoul (KR); Kijun Kim, Seoul (KR); Kunil Yum, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/483,020

(22) PCT Filed: Feb. 1, 2018

(86) PCT No.: PCT/KR2018/001379
§ 371 (c)(1),
(2) Date: Aug. 1, 2019

(87) PCT Pub. No.: WO2018/143688
PCT Pub. Date: Aug. 9, 2018

(65) Prior Publication Data
US 2020/0021413 A1 Jan. 16, 2020

Related U.S. Application Data

(60) Provisional application No. 62/453,005, filed on Feb. 1, 2017, provisional application No. 62/476,007, filed on Mar. 24, 2017.

(51) Int. Cl.
*H04L 5/00* (2006.01)
*H04J 13/18* (2011.01)
(Continued)

(52) U.S. Cl.
CPC ............ *H04L 5/0051* (2013.01); *H04J 13/18* (2013.01); *H04L 5/0026* (2013.01);
(Continued)

(58) Field of Classification Search
CPC ... H04L 5/0051; H04L 5/0026; H04L 5/0094; H04L 5/0023; H04J 13/18;
(Continued)

(56) References Cited

U.S. PATENT DOCUMENTS

2017/0180194 A1* 6/2017 Noh ...................... H04L 5/0048

FOREIGN PATENT DOCUMENTS

WO  2017010753  1/2017

OTHER PUBLICATIONS

PCT International Application No. PCT/KR2018/001379, International Search Report dated May 23, 2018, 5 pages.
(Continued)

*Primary Examiner* — Dady Chery
(74) *Attorney, Agent, or Firm* — Lee, Hong, Degerman, Kang & Waimey PC

(57) ABSTRACT

Disclosed are a method for transmitting and receiving a channel state information reference signal in a wireless communication system and a device therefor. Specifically, a method for transmitting, by a base station, a channel state information-reference signal (CSI-RS) in a wireless communication system includes: transmitting configuration information of the CSI-RS to user equipment (UE); and transmitting, to the UE, the CSI-RS through one or more antenna ports, in which the position of an orthogonal frequency division multiplexing (OFDM) symbol for transmitting the CSI-RS may be configured by the configuration information, and the position of a resource element (RE) for transmitting the CSI-RS may be determined by M RE units (M is 1 and/or 2 and/or 4 and/or 8).

11 Claims, 37 Drawing Sheets

(51) Int. Cl.
*H04W 72/04* (2009.01)
*H04J 13/16* (2011.01)

(52) U.S. Cl.
CPC ..... *H04W 72/042* (2013.01); *H04W 72/0413* (2013.01); *H04J 2013/165* (2013.01)

(58) Field of Classification Search
CPC ......... H04J 2013/165; H04W 72/0413; H04W 72/042; H04B 7/0469; H04B 7/0486
See application file for complete search history.

(56) References Cited

OTHER PUBLICATIONS

Nokia, Alcatel-Lucent Shanghai Bell, "Details on Port Mapping and Density Reduction for Non-precoded CSI-RS," 3GPP TSG-RAN WG1 #87, R1-1611281, Nov. 2016, 11 pages.
Fujitsu, "Aggregated CSI-RS Configuration and Signaling," 3GPP TSG-RAN WG1 #87, R1-1611463, Nov. 2016, 6 pages.
LG Electronics, "Discussion on remaining details for NP CSI-RS," 3GPP TSG-RAN Meeting #87, R1-1611752, Nov. 2016, 6 pages.
Intel Corporation, "On CSI-RS for NR," 3GPP TSG-RAN WG1 #87, R1-1611977, Nov. 2016, 7 pages.

* cited by examiner (a)

1 or 2 ports 4 ports 8 ports (a)

(b)

(c)

(a) CONSECUTIVE OFDM SYMBOLS
FOR CSI-RS TRANSMISSION (b) NON-CONSECUTIVE OFDM SYMBOLS
FOR CSI-RS TRANSMISSION (a)

(b)

METHOD FOR TRANSRECEIVING CHANNEL STATE INFORMATION-REFERENCE SIGNAL IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2018/001379, filed on Feb. 1, 2018, which claims the benefit of U.S. Provisional Application No. 62/453,005, filed on Feb. 1, 2017 and 62/476,007, filed on Mar. 24, 2017, the contents of which are all hereby incorporated by reference herein in their entireties.

TECHNICAL FIELD

The present invention relates to a wireless communication system, and more particularly, to a method for transmitting and receiving a channel state information reference signal in a wireless communication system supporting a multi-antenna system (in particular, 2 dimensional active antenna system (2D AAS)).

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for transmitting and receiving a channel state information reference signal in a wireless communication system supporting a multi-antenna system (e.g., a 2D AAS system or a 3 dimensional multi-input multi-output (3D-MIMO) system with a massive antenna port).

An object of the present invention is to propose an antenna port numbering method for transmitting a channel state information reference signal in a wireless communication system supporting a multi-antenna system.

The technical objects of the present invention are not limited to the aforementioned technical objects, and other technical objects, which are not mentioned above, will be apparently appreciated by a person having ordinary skill in the art from the following description.

Technical Solution

In an aspect, provided is a method for transmitting, by a base station, a channel state information-reference signal (CSI-RS) in a wireless communication system, which includes: transmitting configuration information of the CSI-RS to user equipment (UE); and transmitting, to the UE, the CSI-RS through one or more antenna ports, in which the position of an orthogonal frequency division multiplexing (OFDM) symbol for transmitting the CSI-RS may be configured by the configuration information, and the position of a resource element (RE) for transmitting the CSI-RS may be determined by M RE units (M is 1 and/or 2 and/or 4 and/or 8).

In another aspect, provided is a method for receiving, by user equipment (UE), a channel state information-reference signal in a wireless communication system, which includes: receiving, from a base station, configuration information of the CSI-RS; and receiving, from the base station, the CSI-RS through one or more antenna ports, in which the position of an orthogonal frequency division multiplexing (OFDM) symbol for transmitting the CSI-RS may be configured by the configuration information, and the position of a resource element (RE) for transmitting the CSI-RS may be determined by M RE units (M is 1 and/or 2 and/or 4 and/or 8).

Preferably, when the CSI-RS is transmitted in non-consecutive OFDM symbols, the positions of the OFDM symbols for transmitting the CSI-RS may be configured by the configuration information.

Preferably, the M value may be configured by the configuration information.

Preferably, the CSI-RS through M antenna ports may be subjected to code division multiplexing (CDM-M) by the M RE units.

Preferably, a CDM pattern may be configured by the configuration information, and the CDM pattern may indicate any one of frequency domain CDM, time domain CDM, or frequency and time domain CDM.

Preferably, when CDM-4 is applied by 4 RE units, time/frequency domain CDM-2 and frequency/time domain CDM-2 are combined to apply the CDM-4 to the 4 RE units.

Preferably, when CDM-8 is applied by 8 RE units, time/frequency domain CDM-2 and frequency/time domain CDM-4 are combined to apply the CDM-8 to the 8 RE units.

Preferably, when the M is 1, the CDM may not be applied for transmitting the CSI-RS.

Preferably, a density d value of the CSI-RS may be configured by the configuration information, and the d is larger than, the CSI-RS may be transmitted at a subcarrier spacing of 12/d.

Preferably, the CSI-RS may not be transmitted in an RE overlapped with a demodulation reference signal (DMRS).

Advantageous Effects

According to an embodiment of the present invention, channel state information of a user equipment can be effectively acquired in a wireless communication system supporting a multi-antenna system.

Further, according to an embodiment of the present invention, it is possible to precisely manage transmission/reception beams between a base station and a user equipment in a wireless communication system supporting a multi-antenna system, thereby enhancing wireless communication throughput.

Advantages which can be obtained in the present invention are not limited to the aforementioned effects and other unmentioned advantages will be clearly understood by those skilled in the art from the following description.

DESCRIPTION OF DRAWINGS

The accompanying drawings, which are included herein as a part of the description for help understanding the present invention, provide embodiments of the present invention, and describe the technical features of the present invention with the description below.

FIG. 9 is a diagram illustrating resources to which reference signals are mapped in a wireless communication system to which the present invention may be applied.

MODE FOR INVENTION

Figure 1:
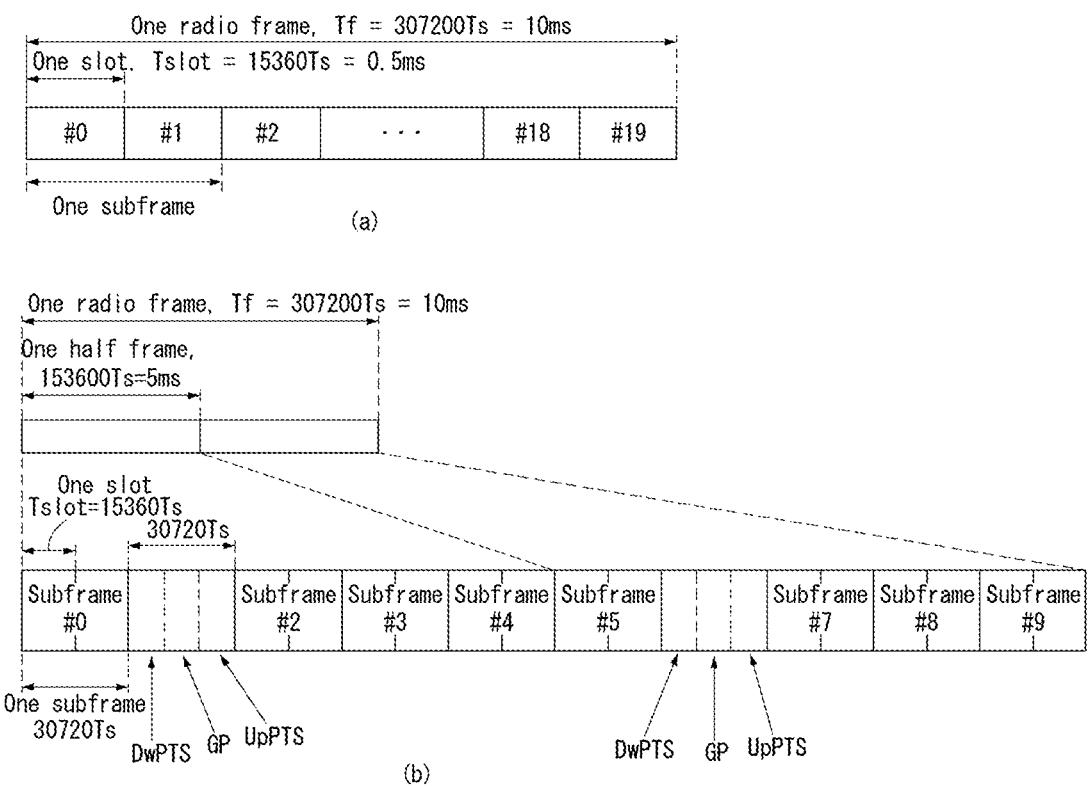
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station.

The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$.

A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | \multicolumn{10}{c}{Subframe number} |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point when the downlink is changed to the uplink or a point when the uplink is switched to the downlink is referred to as a switching point. Switch-point periodicity means a period in which an aspect in which the uplink subframe and the downlink subframe are switched is similarly repeated and both 5 ms and 10 ms are supported. When the downlink-downlink switch-point periodicity is 5 ms, the special subframe S exists for each half-frame and when the downlink-uplink switch-point periodicity is 5 ms, the special subframe S exists only in a first half-frame.

In all configurations, subframes #0 and #5 and the DwPTS are periods only for the downlink transmission. The UpPTS and the subframe and a subframe immediately following the subframe are always periods for the uplink transmission.

The uplink-downlink configuration as system information may be known by both the base station and the UE. The base station transmits only an index of configuration information whenever the configuration information is changed to notify the UE of a change of an uplink-downlink assignment state of the radio frame. Further, the configuration information as a kind of downlink control information may be transmitted through a physical downlink control channel (PDCCH) similar to another scheduling information and as broadcast information may be commonly transmitted to all UEs in a cell through a broadcast channel.

Table 2 represents configuration (length of DwPTS/GP/UpPTS) of a special subframe.

12×7 resource elements. The number of RBs $N^{DL}$ included in a downlink slot depends on a downlink transmission bandwidth.

The structure of an uplink slot may be the same as that of a downlink slot.

Figure 3:
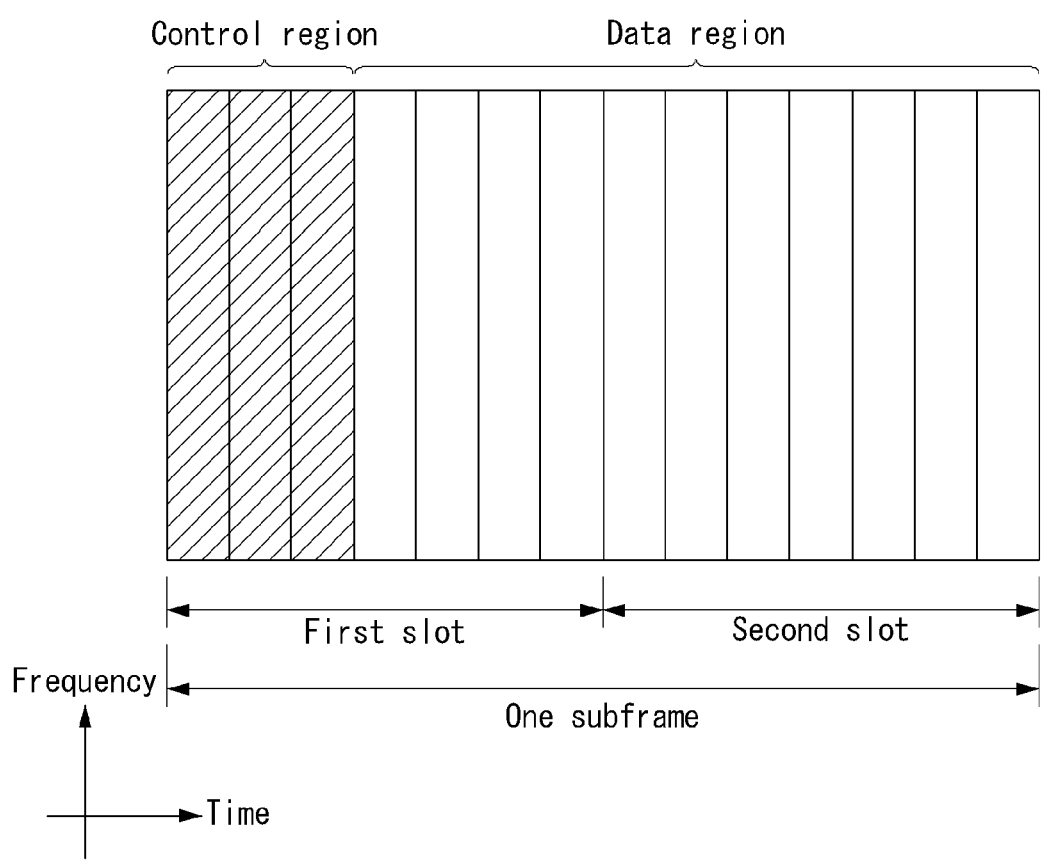
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
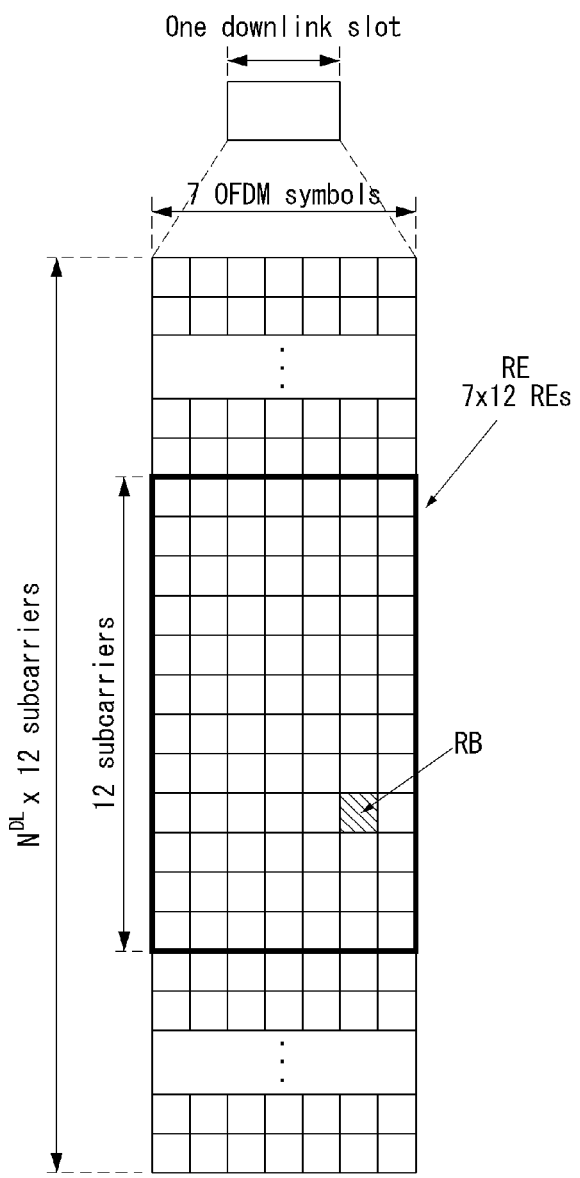
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes The PDCCH may carry resource allocation and a transmission format (also referred to as a downlink (DL) grant) of a downlink-shared channel (DL-SCH), resource allocation information (also referred to as an uplink (UL) grant) of an uplink shared channel (UL-SCH), paging information on a paging channel (PCH), system information on the DL-SCH, resource allocation of an upper layer control message such as a random access response transmitted on a PDSCH, activation of a set of transmission power control (TPC) commands for individual UEs in a predetermined UE group and a voice over Internet protocol (VoIP), and the like. A plurality of PDCCHs may be transmitted in the control region and the UE may monitor the plurality of PDCCHs. The PDCCH is configured by one control channel element or a set of a plurality of consecutive control channel elements (CCEs). The CCE is a logical allocation unit used for providing a coding rate depending on a state of a radio channel to the PDCCH. The CCE corresponds to a plurality of resource element groups. A format of the PDCCH and the number of bits of the PDCCH available are determined according to an association relationship between the number of CCEs and the coding rate provided by the CCEs.

The eNB decides a PDCCH format according to the DCI to be sent to the UE and attaches cyclic redundancy check (CRC) to the control information. The CRC is masked with a radio network temporary identifier (RNTI) according to an owner or a purpose of the PDCCH. The CRC may be masked with a unique identifier (e.g., cell-RNTI (C-RNTI)) of the UE in the case of the PDCCH for a specific UE. Alternatively, in the case of the PDCCH for the paging message, the CRC may be masked with a paging indication identifier (e.g., paging-RNTI (P-RNTI)). In the case of the PDCCH for system information, more specifically, a system information block (SIB), the CRC may be masked with a system information-RNTI (SI-RNTI). The CRC may be masked with a random access-RNTI (RA-RNTI) in order to indicate a random access response which is a response to transmission of a random access preamble of the UE.

Figure 4:
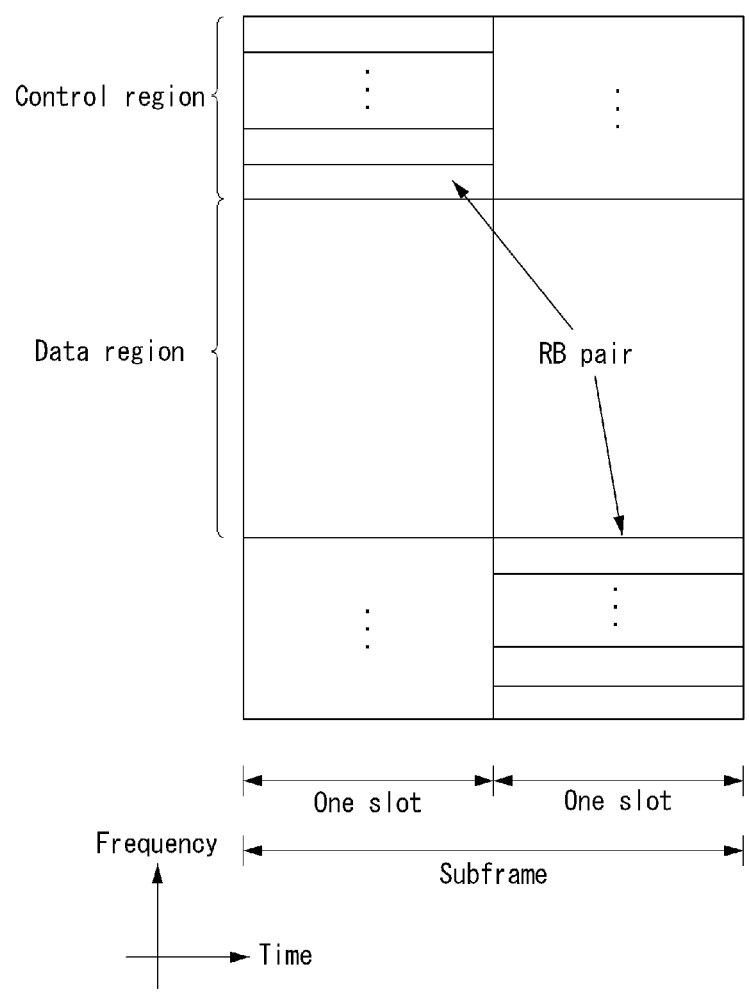
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
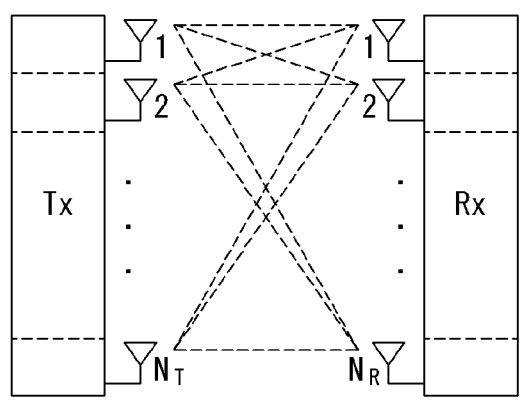
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \qquad \text{[Equation 2]}$$

Meanwhile, transmission power may be different in each of pieces of transmission information s_1, s_2, s_NT. In this case, if pieces of transmission power are P_1, P_2, ..., P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_N s_{N_T}]^T \qquad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, the information vector having controlled transmission power in the Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In this case, w_ij denotes weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y = [y_1, y_2, \ldots, y_{N_R}]^T \qquad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
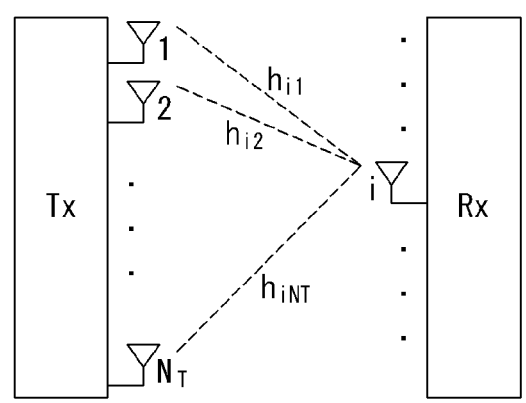
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \qquad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

Meanwhile, Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n = [n_1, n_2, \ldots, n_{N_R}]^T \qquad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} + Hx + n \quad \text{[Equation 10]}$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Hereinafter, in association with the MIMO transmission techniques described above, a codebook based precoding technique will be described in more detail.

Figure 7:
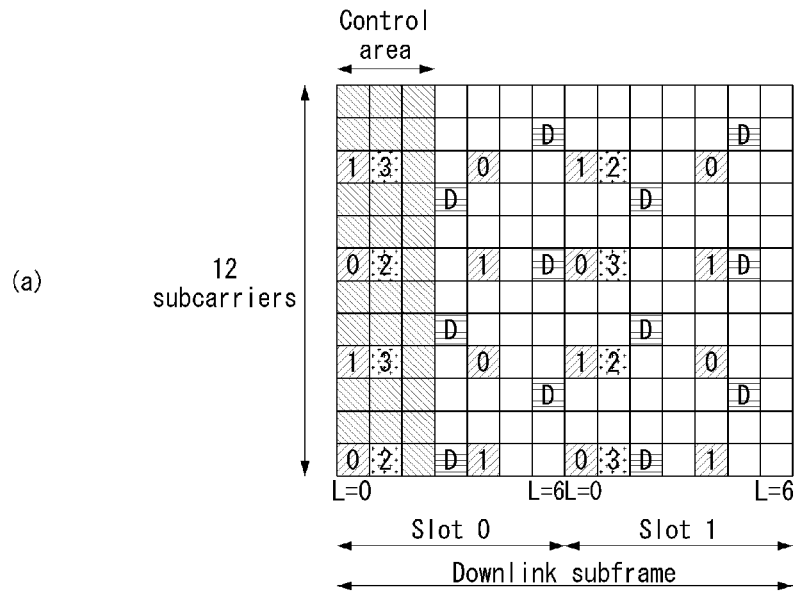
FIG. 7 is a diagram for describing a basic concept of codebook based precoding in a wireless communication system to which the present invention may be applied.
Figure 7:
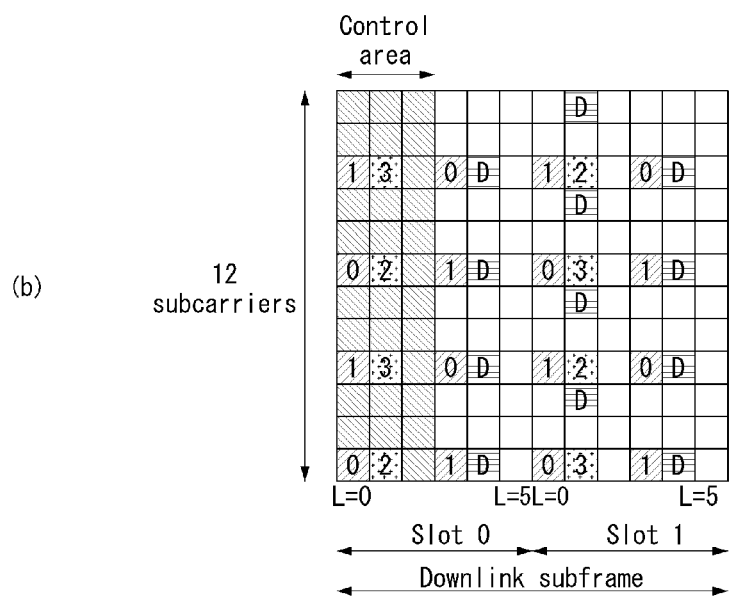

FIG. 7 is a diagram for describing a basic concept of codebook based precoding in a wireless communication system to which the present invention may be applied.

According to the codebook based precoding technique, the transmitting side an the receiving side share codebook information including a predetermined number of precoding matrixes according to a transmission rank, the number of antennas, and the like.

That is, when feedback information is infinite, the codebook based precoding technique may be used.

The receiving side measures the channel state through the received signal to feed back an infinite number of preferred precoding matrix information (that is, an index of the corresponding precoding matrix) to the transmitting side based on the codebook information. For example, the receiving side measures the received signal by a maximum likelihood (ML) or minimum mean square error (MMSE) technique to select the optimal precoding matrix.

It is illustrated that the receiving side transmits to the transmitting side the precoding matrix information for each codeword in FIG. 7, but the present invention need not be limited thereto.

The transmitting side that receives the feedback information from the receiving side may select a specific precoding matrix from the codebook based on the received information. The transmitting side that selects the precoding matrix may perform the precoding by a method that multiplies layer signals of a number corresponding to the transmission rank by the selected precoding matrix and transmit the transmitted signal of which precoding is performed through a plurality of antennas. In the precoding matrix, the number of rows is the same as the number of antennas and the number of columns is the same as a rank value. Since the rank value is the same as the number of layers, the number of columns is the same as the number of layers. For example, when the number of transmission antennas is 4 and the number of transmission layers is 2, the precoding matrix may be configured by a 4×2 matrix. Equation 12 below shows an operation of mapping information mapped to each layer to each antenna through the precoding matrix in such a case.

$$\begin{bmatrix} y_1 \\ y_2 \\ y_3 \\ y_4 \end{bmatrix} = \begin{bmatrix} p_{11} & y_1 \\ p_{12} & y_1 \\ p_{13} & y_1 \\ p_{14} & y_1 \end{bmatrix} \cdot \begin{bmatrix} x_1 \\ x_2 \end{bmatrix} \quad \text{[Equation 12]}$$

Referring to Equation 12, the information mapped to the layer is x_1 and x_2 and each element P_ij of the 4×2 matrix is a weight used for precoding. y_1, y_2, y_3, and y_4 which are information mapped to the antennas may be transmitted through the respective antennas using respective OFDM transmission schemes.

The receiving side that receives the signal precoded and transmitted by the transmitting side performs inverse processing of the precoding performed by the transmitting side to restore the received signal. In general, the precoding matrix satisfies a unitary matrix (U) condition such as U·U^H=I (here, U^H represents a matrix of matrix U), therefore, the inverse processing of the precoding may be performed by multiplying the received signal by Hermit matrix P^H of the precoding matrix P used for the precoding of the transmitting side.

Further, since the precoding is required to have good performance for various schemes of antenna configurations, it is necessary to consider the performance of various antenna configurations in a codebook design. Hereinafter, an exemplary configuration of multiple antennas will be described.

In the existing 3GPP LTE system (for example, a system according to the 3GPP LTE Release-8 or 9 standard), up to 4 transmission antennas are supported in the downlink, and as a result, a codebook for 4 transmission antennas is designed. The 3GPP LTE-A system, which is an evolution of the existing 3GPP LTE, may support up to 8 transmission antennas in the downlink. Therefore, it is required to design a precoding codebook that provides good performance for downlink transmission over up to 8 transmission antennas.

Further, in the codebook design, it is generally required to provide good performance for a constant modulus property, infinite alphabet, constraint on a codebook size, a nested property, and various antenna configurations.

The constant modulus property means a property in which an amplitude of each channel component of the precoding matrix constituting the codebook is constant. According to such a property, regardless of which precoding matrix is used, power levels transmitted from all antennas, respectively may be kept to be the same as each other. Thus, the efficiency of use of a power amplifier may be increased.

The infinite alphabet means, for example, that in the case of two transmission antennas, the precoding matrices are configured by using only a quadrature phase shift keying (QPSK) alphabet (i.e., ±1, ±j) except for a scaling factor. Thus, complexity of computation may be mitigated in multiplication of the precoding matrix by the precoder.

The codebook size may be constrained to a predetermined size or less. As the size of the codebook increases, the precoding matrices for various cases may be included, and as a result, the channel state may be more accurately reflected, but the number of bits of a precoding matrix indicator (PMI) increases, which may cause signaling overhead.

The nested property means that a part of a high-rank precoding matrix is configured by a low-rank precoding matrix. When the precoding matrix is configured as such, proper performance may be ensured even when the eNB determines to perform downlink transmission at a transmission rank lower than a channel rank indicated by a rank indicator (RI) reported from the UE. Further, according to such a property, the complexity of Channel Quality Information (CQI) computation may be reduced. The reason is that at the time of performing an operation of selecting the precoding matrix among precoding matrices designed for different ranks, a part of computation for selecting the precoding matrix may be shared.

Providing the good performance for various antenna configurations means that it is required to provide performance of a predetermined criterion or higher for various cases including an antenna configuration having a low correlation, an antenna configuration having a high correlation, or a cross-polarized antenna configuration.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 8:
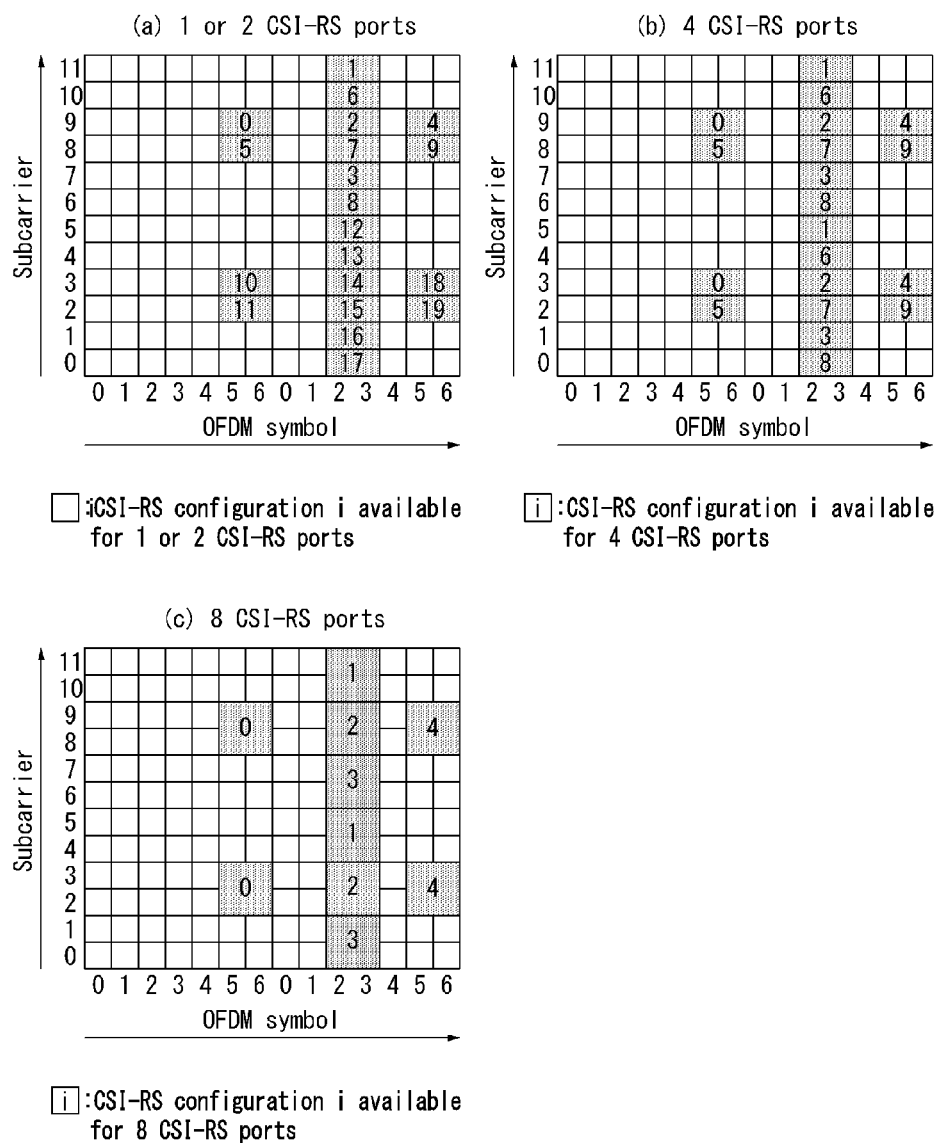
FIG. 8 illustrates reference signal patterns mapped to downlink resource block pairs in a wireless communication system to which the present invention may be applied.

FIG. 8 illustrates reference signal patterns mapped to downlink resource block pairs in a wireless communication system to which the present invention may be applied.

Referring to FIG. 8, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7*a*) and has a length of 12 OFDM symbols in the case of an extended cyclic prefix (CP) (FIG. 7*b*). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

Hereinafter, when the CRS is described in more detail, the CRS is used for estimating the channel of the physical antenna and is distributed in an entire frequency band as a reference signal which may be commonly received by all UEs positioned in the cell. That is, the CRS as a cell-specific signal is transmitted every subframe for a wideband. Further, the CRS may be used for the channel quality information (CSI) and the data demodulation.

The CRS is defined in various formats according to an antenna array at the transmitting side (eNB). In the 3GPP LTE system (e.g., release-8), the RSs are transmitted based on maximum 4 antenna ports depending on the number of transmission antennas of the eNB. The transmitting side of the downlink signal has three types of antenna arrays such as a single transmission antenna, two transmission antennas, and four transmission antennas. For instance, in case that the number of the transmission antennas of the base station is 2, CRSs for antenna #0 and antenna #1 are transmitted. For another instance, in case that the number of the transmission antennas of the base station is 4, CRSs for antennas #0 to #3 are transmitted. When the number of transmission antennas of the eNB, the CRS pattern in one RB is illustrated in FIG. 8.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

Hereinafter, when the DRS is described in more detail, the DRS is used for demodulating data. A precoding weight used for a specific UE in MIMO transmission is used without any change in order to estimate a channel corresponding in combination with the transport channel transmitted in each transmission antenna when the UE receives the reference signal.

The 3GPP LTE system (e.g., Release-8) supports up to four transmission antennas and the DRS for rank 1 beamforming is defined. The DRS for rank 1 beamforming also indicates a reference signal for antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier spacing Δf=15 kHz.

In a subframe configured for CSI-RS transmission, a CSI-RS sequence is mapped to a complex-valued modulation symbol a_k,l^(p) used as a reference symbol on each antenna port p as in Equation 13.

$$a_{k,l}^{(p)} = w_{l''} \cdot r_{l,n_s}(m')$$ [Equation 13]

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 13, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |

TABLE 3-continued

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
|  | 12 | (5, 2) | 1 |  |  |  |  |
|  | 13 | (4, 2) | 1 |  |  |  |  |
|  | 14 | (3, 2) | 1 |  |  |  |  |
|  | 15 | (2, 2) | 1 |  |  |  |  |
|  | 16 | (1, 2) | 1 |  |  |  |  |
|  | 17 | (0, 2) | 1 |  |  |  |  |
|  | 18 | (3, 5) | 1 |  |  |  |  |
|  | 19 | (2, 5) | 1 |  |  |  |  |
| Frame structure type 2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1 |  |  |  |  |

Table 4 illustrates the mapping of (k',l') from a CSI-RS configuration in an extended CP.

TABLE 4

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |
|  | 13 | (6, 4) | 1 |  |  |  |  |
|  | 14 | (1, 4) | 1 |  |  |  |  |
|  | 15 | (0, 4) | 1 |  |  |  |  |
| Frame structure type 2 only | 16 | (11, 1) | 1 | (11, 1) | 1 | (11, 1) | 1 |
|  | 17 | (10, 1) | 1 | (10, 1) | 1 | (10, 1) | 1 |
|  | 18 | (9, 1) | 1 | (9, 1) | 1 | (9, 1) | 1 |
|  | 19 | (5, 1) | 1 | (5, 1) | 1 |  |  |
|  | 20 | (4, 1) | 1 | (4, 1) | 1 |  |  |
|  | 21 | (3, 1) | 1 | (3, 1) | 1 |  |  |
|  | 22 | (8, 1) | 1 |  |  |  |  |
|  | 23 | (7, 1) | 1 |  |  |  |  |
|  | 24 | (6, 1) | 1 |  |  |  |  |
|  | 25 | (2, 1) | 1 |  |  |  |  |
|  | 26 | (1, 1) | 1 |  |  |  |  |
|  | 27 | (0, 1) | 1 |  |  |  |  |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

Figure 9:
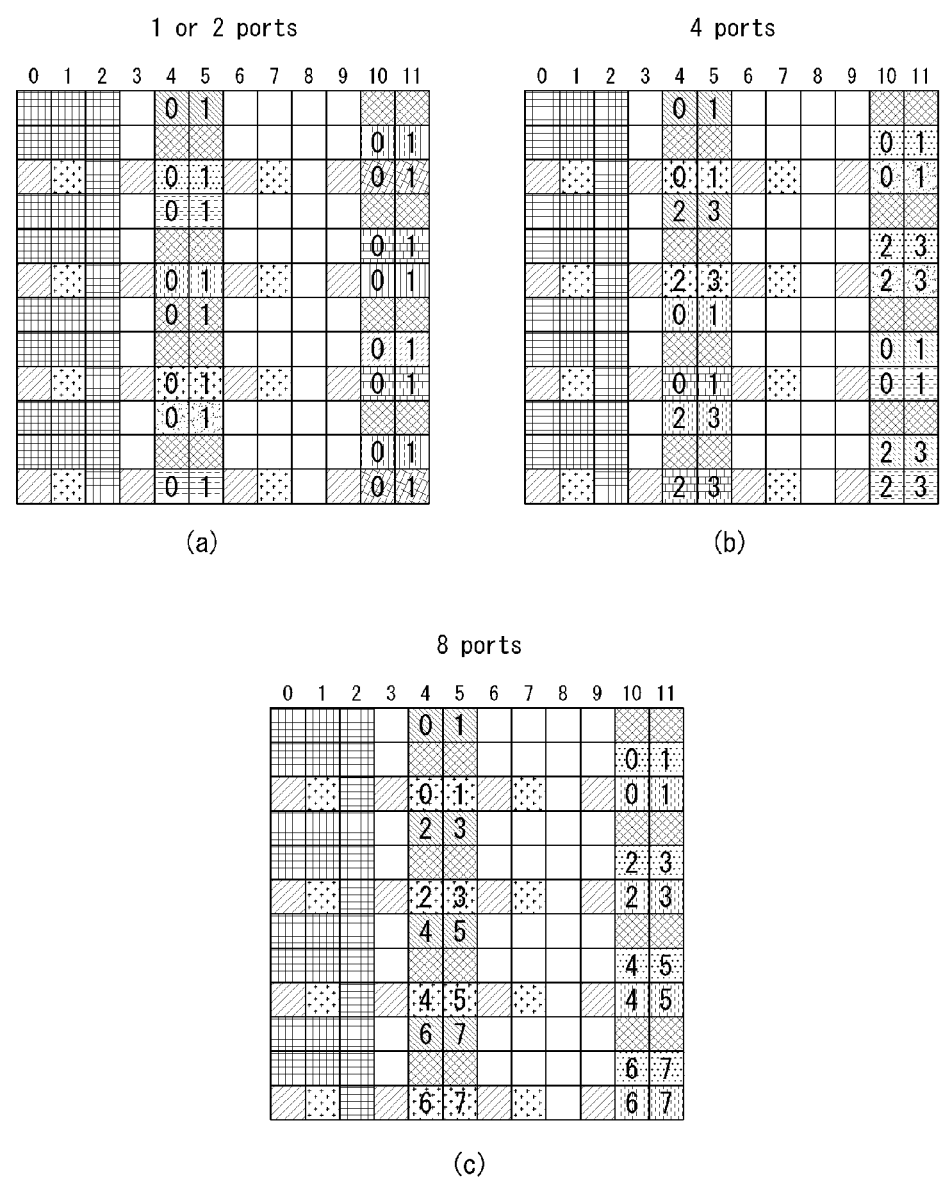

FIG. 9 is a diagram illustrating resources to which reference signals are mapped in a wireless communication system to which the present invention may be applied.

FIG. 9(a) shows twenty types of CSI-RS configurations available for CSI-RS transmission by one or two CSI-RS antenna ports, FIG. 9(b) shows ten types of CSI-RS configurations available for four CSI-RS antenna ports, and FIG. 9(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 9(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 9(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 9(c).

A CSI-RS for each antenna port is subjected to CDM (Code Division Multiplexing) for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIG. 9(a) to (c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in a single cell. Only zero or one CSI-RS configuration may be used for a non-zero power (NZP) CSI-RS and zero or multiple CSI-RS configurations may be used for a zero power (ZP) CSI-RS.

For each bit set to 1 in a zero-power (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubfameConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, CSI-RS periodicity TCSI-RS and a subframe offset ΔCSI-RS are determined depending on CSI-RS subframe configuration ICSI-RS.

The CSI-RS subframe configuration in Table 5 may be set to one of the aforementioned 'SubframeConfig' field and 'zeroTxPowerSubframeConfig' field. The CSI-RS subframe configuration may be separately set for an NZP CSI-RS and a ZP CSI-RS.

A subframe including a CSI-RS satisfies Equation 14.

$$(10n_f+\lfloor n_s/2 \rfloor - \Delta_{CSI-RS}) \bmod T_{CSI-RS} = 0 \quad \text{[Equation 14]}$$

In Equation 14, TCSI-RS indicates CSI-RS periodicity, ΔCSI-RS indicates a subframe offset value, of denotes a system frame number, and ns denotes a slot number.

In the case of a UE for which transmission mode 9 is set with respect to a serving cell, a single CSI-RS resource configuration may be set for the UE. In the case of a UE for which transmission mode 10 is set with respect to the serving cell, one or more CSI-RS resource configurations may be set for the UE.

In the current LTE standard, the CSI-RS configuration is constituted by antennaPortsCount, subframeConfig, resourceConfig, etc., and indicates how many antenna ports the CSI-RS is transmitted from, how the periodicity and offset of the subframe to be transmitted by the CSI-RS, and at which RE position (frequency and OFDM symbol index) in the corresponding subframe the CSI-RS is transmitted.

Specifically, parameters for each CSI-RS (resource) configuration are configured through higher layer signaling as follows.

When transmission mode 10 is configured, a CSI-RS resource configuration identifier CSI-RS port count (antennaPortsCount): Parameters (e.g., 1 CSI-RS port, 2 CSI-RS port, 4 CSI-RS port, and 8 CSI-RS port) indicating the number of antenna ports used for CSI-RS transmission CSI-RS configuration (resourceConfig) (see Tables 3 and 4): Parameter for CSI-RS allocation resource position CSI-RS subframe configuration (subframeConfig, i.e., I_CSI-RS) (see Table 5): Parameter for subframe period and offset in which CSI-RS is to be transmitted When transmission mode 9 is configured, transmission power for CSI feedback (P_C): With respect to the assumption of the UE for the reference PDSCH transmission power for feedback, when the UE derives the CSI feedback and takes a value within the [−8, 15] dB range in 1 dB step size, P_C is assumed as a ratio of energy per PDSCH RE (Energy Per Resource Element (EPRE)) and CSI-RS EPRE.

When transmission mode 10 is configured, transmission power for CSI feedback with respect to each CSI process (P_C): When CSI subframe sets C_CSI,0 and C_CSI,1 are configured with respect to the CSI process by the higher layer, P_C is configured for each CSI subframe set of the CSI process.

Pseudo-random sequence generator parameter (n_ID)

When transmission mode 10 is configured, QCL scrambling identity for QuasiCo-Located (QCL) type B UE assumption (qcl-ScramblingIdentity-r11), CRS port count (crs-PortsCount-r11), higher layer parameter ('qcl-CRS-Info-r11') including an MBSFN suvframe configuration list (mbsfn-SubframeConfigList-r11) parameter When the CSI feedback value derived by the UE has a value within the [−8, 15] dB range, P_C is assumed as the ratio of PDSCH EPRE to CSI-RS EPRE. Here, the PDSCH EPRE corresponds to a symbol in which the ratio of the PDSCH EPRE to the CRS EPRE is $\rho\_A$.

The CSI-RS and the PMCH are not configured together in the same subframe of the serving cell.

When four CRS antenna ports are configured in frame structure type 2, in the UE, a CSI-RS configuration index which belongs to a set [20-31] set (see Table 3) in the case of the normal CP or a set or a set [16-27] (see Table 4) in the case of the extended CP is not configured.

The UE may assume that the CSI-RS antenna port of the CSI-RS resource configuration has a QCL relationship with respect to a delay spread, Doppler spread, a Doppler shift, an average gain, and an average delay.

The UE in which transmission mode 10 and QCL type B are configured may assume that antenna ports 0 to 3 corresponding to the CSI-RS resource configuration and antenna ports 15 to 22 corresponding to the CSI-RS resource configuration have the QCL relationship with respect to the Doppler spread, and the Doppler shift.

In the case of the UE in which transmission modes 1 to 9, one ZP CSI-RS resource configuration may be configured with respect to the serving cell in the UE. In the case of the UE in which transmission mode 10, one or more ZP CSI-RS resource configurations may be configured with respect to the serving cell in the UE.

The following parameters for the ZP CSI-RS resource configuration may be configured over the higher layer signaling.

ZP CSI-RS configuration (zeroTxPowerResourceConfigList) (see Tables 3 and 4): Parameter for zero-power CSI-RS configuration ZP CSI-RS subframe configuration (eroTxPowerSubframeConfig, i.e., I_CSI-RS) (see Table 5): Parameter for subframe period and/or offset in which zero-power CSI-RS is to be transmitted The ZP CSI-RS and the PMCH are not configured together in the same subframe of the serving cell.

In the case of the UE in which transmission mode 10, one or more Channel-State Information-Interference Measurement (CSI-IM) resource configurations may be configured with respect to the serving cell.

The following parameters for each CSI-IM resource configuration may be configured over the higher layer signaling.

ZP CSI-RS configuration (see Tables 3 and 4)

ZP CSI-RS subframe configuration (I_CSI-RS) (see Table 5)

The CSI-IM resource configuration is the same as any one of the configured ZP-CSI-RS resource configurations.

The CSI-IM resource and the PMCH are not configured together in the same subframe of the serving cell.

Massive MIMO

A MIMO system having a plurality of antennas may be called a massive MIMO system and attracts attention as a means for improving spectral efficiency, energy efficiency and processing complexity.

Recently, the massive MIMO system has been discussed in order to meet requirements for spectral efficiency of future mobile communication systems in 3GPP. Massive MIMO is also called full-dimension MIMO (FD-MIMO).

LTE release-12 and following wireless communication systems consider introduction of an active antenna system (AAS).

Distinguished from conventional passive antenna systems in which an amplifier capable of adjusting the phase and magnitude of a signal is separated from an antenna, the AAS is configured in such a manner that each antenna includes an active element such as an amplifier.

The AAS does not require additional cables, connectors and hardware for connecting amplifiers and antennas and thus has high energy efficiency and low operation costs. Particularly, the AAS supports electronic beam control per antenna and thus can realize enhanced MIMO for forming accurate beam patterns in consideration of a beam direction and a beam width or 3D beam patterns.

With the introduction of enhanced antenna systems such as the AAS, massive MIMO having a plurality of input/ output antennas and a multi-dimensional antenna structure is also considered. For example, when a 2D antenna array instead of a conventional linear antenna array is formed, a 3D beam pattern can be formed using active antennas of the AAS.

Figure 10:
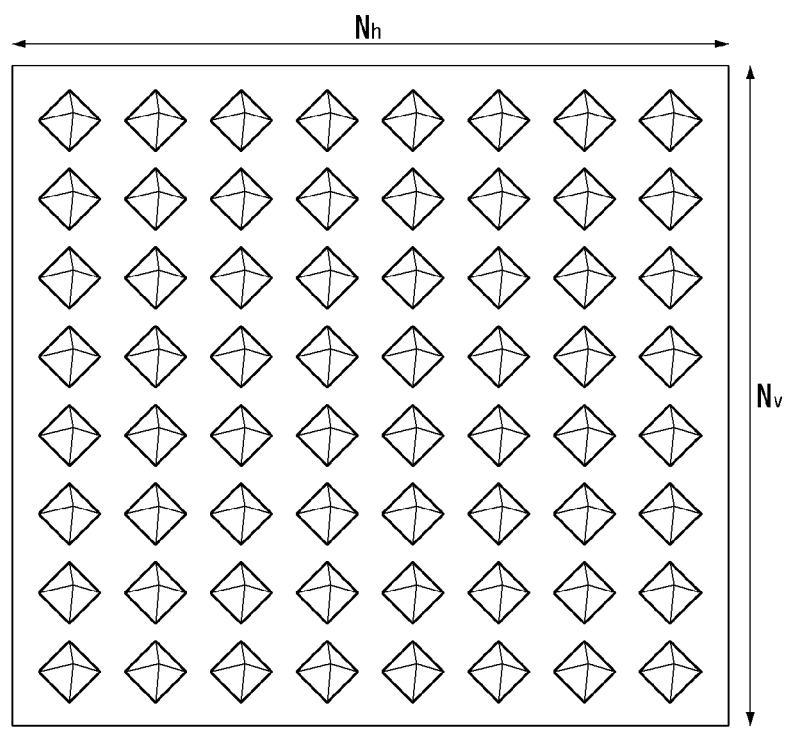
FIG. 10 illustrates a two dimensional active antenna system having 64 antenna elements in a wireless communication system to which the present invention may be applied.

FIG. 10 illustrates a 2D AAS having 64 antenna elements in a wireless communication system to which the present invention is applicable.

FIG. 10 illustrates a normal 2D antenna array. A case in which Nt=Nv·Nh antennas are arranged in a square form, as shown in FIG. 10, may be considered. Here, Nh indicates the number of antenna columns in the horizontal direction and Nv indicates the number of antenna rows in the vertical direction.

When the aforementioned 2D antenna array is used, radio waves can be controlled in both the vertical direction (elevation) and the horizontal direction (azimuth) to control transmitted beams in a 3D space. A wavelength control mechanism of this type may be referred to as 3D beamforming.

Figure 11:
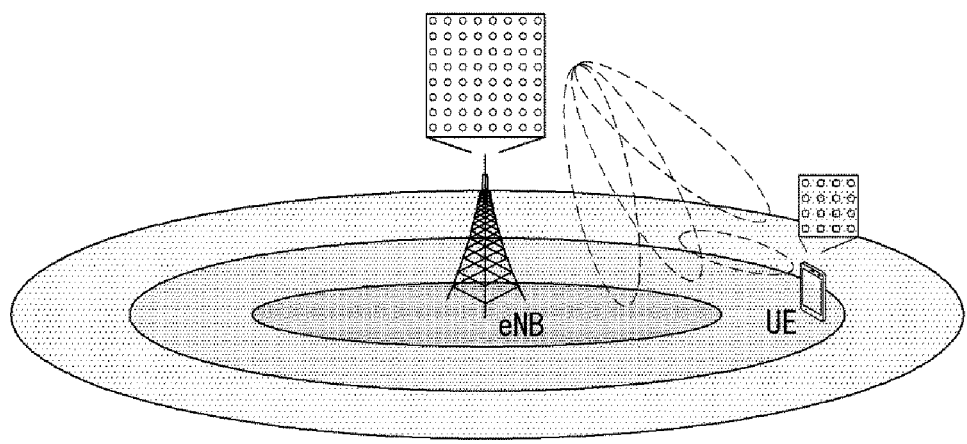
FIG. 11 illustrates a system in which a base station or a terminal has a plurality of transmit/receive antennas capable of AAS-based 3D (3-Dimension) beamforming in a wireless communication system to which the present invention may be applied.

FIG. 11 illustrates a system in which an eNB or a UE has a plurality of transmission/reception antennas capable of forming AAS based 3D beams in a wireless communication system to which the present invention is applicable.

FIG. 11 schematizes the above-described example and illustrates a 3D MIMO system using a 2D antenna array (i.e., 2D-AAS).

From the viewpoint of transmission antennas, quasi-static or dynamic beam formation in the vertical direction as well as the horizontal direction of beams can be performed when a 3D beam pattern is used. For example, application such as sector formation in the vertical direction may be considered.

From the viewpoint of reception antennas, a signal power increase effect according to an antenna array gain can be expected when a received beam is formed using a massive reception antenna. Accordingly, in the case of uplink, an eNB can receive signals transmitted from a UE through a plurality of antennas, and the UE can set transmission power thereof to a very low level in consideration of the gain of the massive reception antenna.

Figure 12:
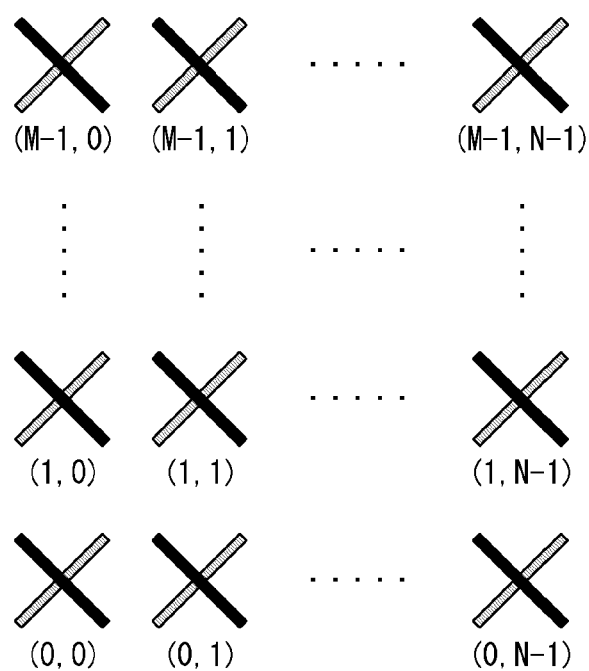
FIG. 12 illustrates a two dimensional antenna system having cross polarization in a wireless communication system to which the present invention may be applied.

FIG. 12 illustrates a 2D antenna system having cross polarization in a wireless communication system to which the present invention is applicable.

2D planar antenna array model considering polarization may be schematized as shown in FIG. 12.

Distinguished from conventional MIMO systems using passive antennas, systems based on active antennas can dynamically control gains of antenna elements by applying a weight to an active element (e.g., amplifier) attached to (or included in) each antenna element. Since a radiation pattern depends on antenna arrangement such as the number of antenna elements and antenna spacing, an antenna system can be modeled at an antenna element level.

The antenna arrangement model as shown in FIG. 12 may be represented by (M, N, P) which corresponds to parameters characterizing an antenna arrangement structure.

M indicates the number of antenna elements having the same polarization in each column (i.e., in the vertical direction) (i.e., the number of antenna elements having +45° slant in each column or the number of antenna elements having −45° slant in each column).

N indicates the number of columns in the horizontal direction (i.e., the number of antenna elements in the horizontal direction).

P indicates the number of dimensions of polarization. P=2 in the case of cross polarization as shown in FIG. 11, whereas P=1 in the case of co-polarization.

An antenna port may be mapped to a physical antenna element. The antenna port may be defined by a reference signal associated therewith. For example, antenna port 0 may be associated with a cell-specific reference signal (CRS) and antenna port 6 may be associated with a positioning reference signal (PRS) in the LTE system.

For example, antenna ports and physical antenna elements may be one-to-one mapped. This may correspond to a case in which a single cross-polarization antenna element is used for downlink MIMO or downlink transmit diversity. For example, antenna port 0 may be mapped to a single physical antenna element, whereas antenna port 1 may be mapped to another physical antenna element. In this case, two downlink transmissions are present in terms of a UE. One is associated with a reference signal for antenna port 0 and the other is associated with a reference signal for antenna port 1.

Alternatively, a single antenna port may be mapped to multiple physical antenna elements. This may correspond to a case in which a single antenna port is used for beamforming. Beamforming can cause downlink transmission to be directed to a specific UE by using multiple physical antenna elements. This can be accomplished using an antenna array composed of multiple columns of multiple cross-polarization antenna elements in general. In this case, a single downlink transmission derived from a single antenna port is present in terms of a UE. One is associated with a CRS for antenna port 0 and the other is associated with a CRS for antenna port 1.

That is, an antenna port represents downlink transmission in terms of a UE rather than substantial downlink transmission from a physical antenna element in an eNB.

Alternatively, a plurality of antenna ports may be used for downlink transmission and each antenna port may be multiple physical antenna ports. This may correspond to a case in which antenna arrangement is used for downlink MIMO or downlink diversity. For example, antenna port 0 may be mapped to multiple physical antenna ports and antenna port 1 may be mapped to multiple physical antenna ports. In this case, two downlink transmissions are present in terms of a UE. One is associated with a reference signal for antenna port 0 and the other is associated with a reference signal for antenna port 1.

In FD-MIMO, MIMO precoding of a data stream may be subjected to antenna port virtualization, transceiver unit (TXRU) virtualization and an antenna element pattern.

In antenna port virtualization, a stream on an antenna port is precoded on TXRU. In TXRU virtualization, a TXRU signal is precoded on an antenna element. In the antenna element pattern, a signal radiated from an antenna element may have a directional gain pattern.

In conventional transceiver modeling, static one-to-on mapping between an antenna port and TXRU is assumed and TXRU virtualization effect is integrated into a (TXRU) antenna pattern including both the effects of the TXRU virtualization and antenna element pattern.

Antenna port virtualization may be performed through a frequency-selective method. In LTE, an antenna port is defined along with a reference signal (or pilot). For example, for transmission of data precoded on an antenna port, a DMRS is transmitted in the same bandwidth as that for a data signal and both the DMRS and the data signal are precoded through the same precoder (or the same TXRU virtualization precoding). For CSI measurement, a CSI-RS is transmitted through multiple antenna ports. In CSI-RS transmission, a precoder which characterizes mapping between a CSI-RS port and TXRU may be designed as an eigen matrix such that a UE can estimate a TXRU virtualization precoding matrix for a data precoding vector.

1D TXRU virtualization and 2D TXRU virtualization are discussed as TXRU virtualization methods, which will be described below with reference to the drawings.

Figure 13:
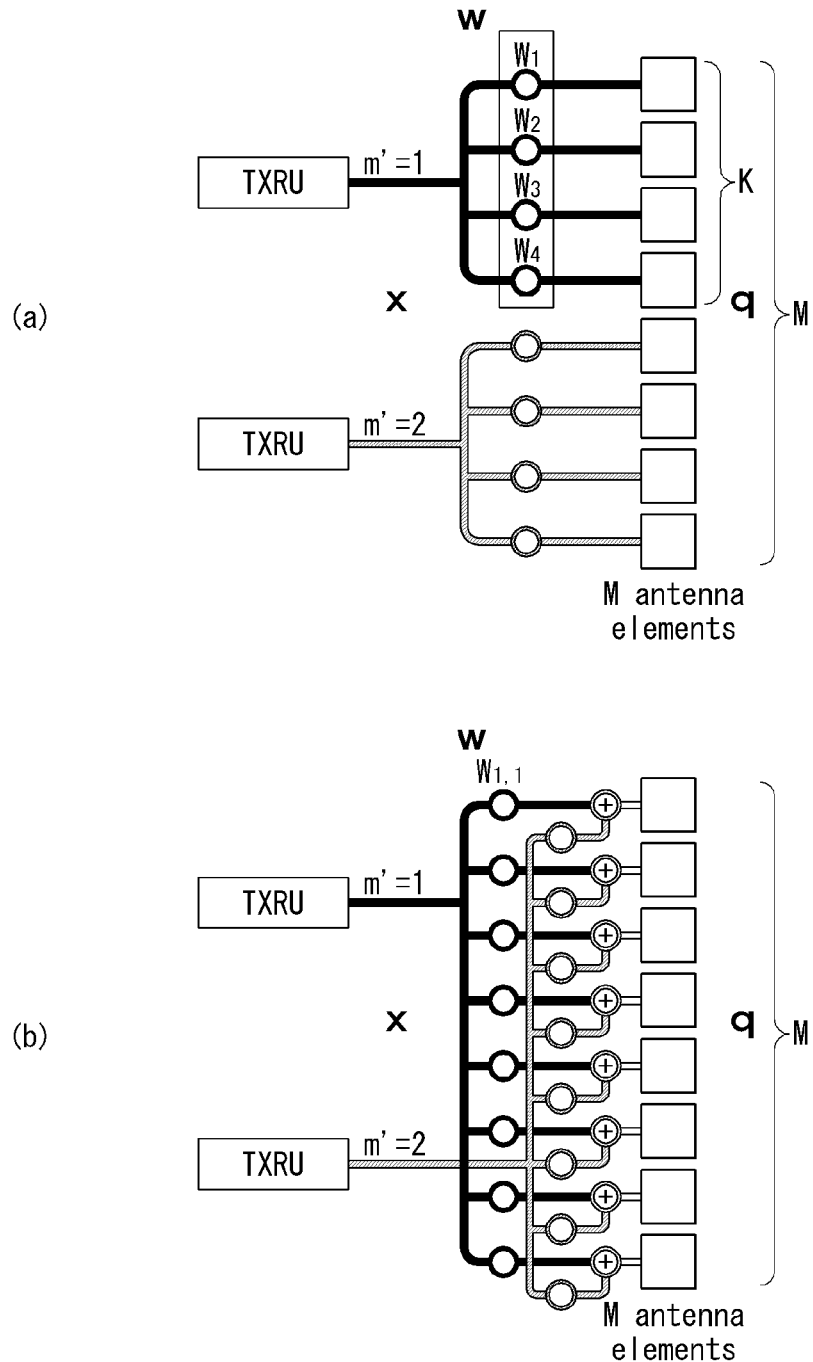
FIG. 13 shows a transceiver unit model in a radio communication system to which the present invention can be applied.

FIG. 13 illustrates transceiver unit models in a wireless communication system to which the present invention is applicable.

In 1D TXRU virtualization, M_TXRU TXRUs are associated with M antenna elements in a single-column antenna arrangement having the same polarization.

In 2D TXRU virtualization, a TXRU model corresponding to the antenna arrangement model (M, N, P) of FIG. 12 may be represented by (M_TXRU, N, P). Here, M_TXRU denotes the number of 2D TXRUs present in the same column and the same polarization, and M_TXRU≤M all the time. That is, a total number of TXRUs is M_TXRU×N×P.

TXRU virtualization models may be divided into TXRU virtualization model option-1: sub-array partition model as shown in FIG. 13(a) and TXRU virtualization model option-2: full-connection model as shown in FIG. 13(b) according to correlation between antenna elements and TXRU.

Referring to FIG. 13(a), antenna elements are partitioned into multiple antenna element groups and each TXRU is connected to one of the groups in the case of the sub-array partition model.

Referring to FIG. 13(b), multiple TXRU signals are combined and delivered to a single antenna element (or antenna element array) in the case of the full-connection model.

In FIG. 13, q is a transmission signal vector of M co-polarized antenna elements in a single column, w is a wideband TXRU virtualization weight vector, W is a wideband TXRU virtualization weight matrix, and x is a signal vector of M_TXRU TXRUs.

Here, mapping between antenna ports and TXRUs may be 1-to-1 or 1-to-many mapping.

FIG. 13 shows an example of TXRU-to-antenna element mapping and the present invention is not limited thereto. The present invention may be equally applied to mapping between TXRUs and antenna elements realized in various manners in terms of hardware.

OFDM Numerology

As more and more communication devices require larger communication capacity, there is a need for improved mobile broadband communication compared to the existing radio access technology (RAT). Further, massive machine type communications (MTCs), which provide various services anytime and anywhere by connecting many devices and objects, are also one of the major issues to be considered in the next generation communication. In addition, in next-generation communication, a communication system design considering a service/UE sensitive to reliability and latency is being discussed. The introduction of next generation radio access technology considering enhanced mobile broadband communication, massive MTC, ultra-reliable and low latency communication (URLLC) is discussed, and in the present invention, the technology is called new RAT.

Hereinafter, in this specification, the technology may be referred to as a radio access network (RAN) to which NR is applied and may be referred to as an NG-RAN (New Generation-RAN) or a gNB, and may be collectively referred to as a base station.

Self-Contained Subframe Structure

Figure 14:
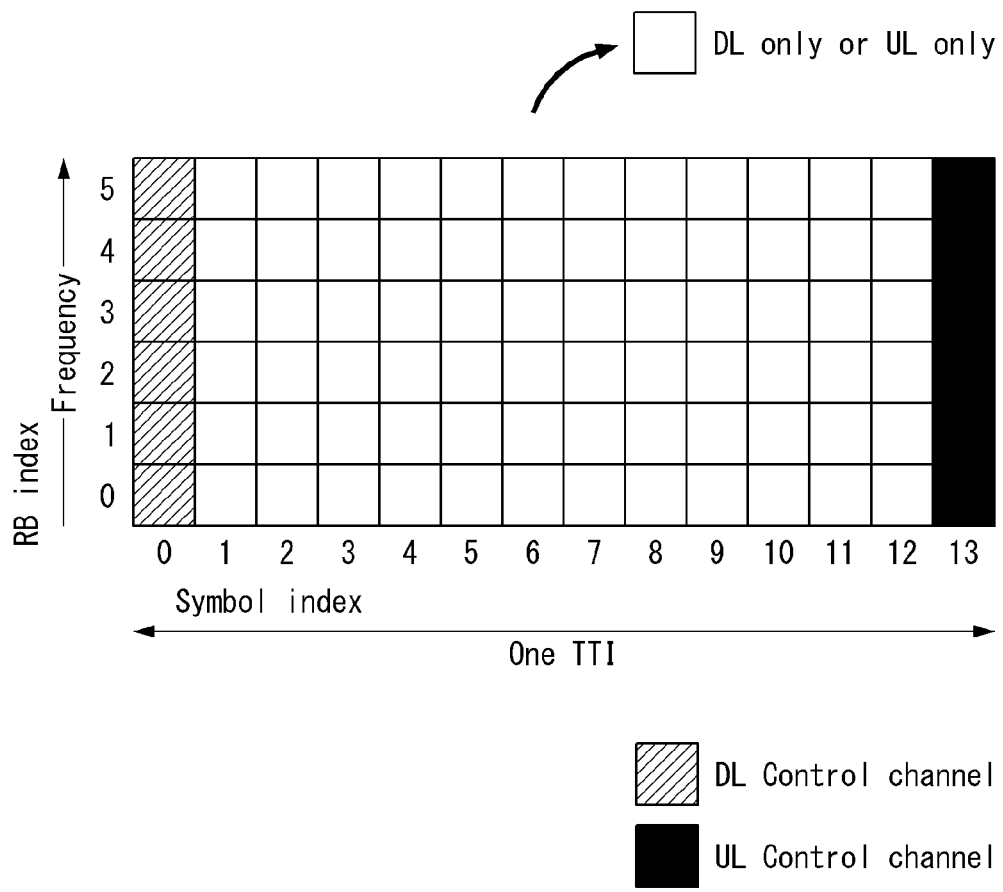
FIG. 14 is a diagram illustrating a self-contained subframe structure in the wireless communication system to which the present invention may be applied.

In order to minimize the latency of data transmission in a TDD system, the fifth generation new RAT considers a self-contained subframe structure in which a control channel and a data channel are time division multiplexed (TDMed) as illustrated in FIG. 14.

FIG. 14 is a diagram illustrating a self-contained subframe structure in the wireless communication system to which the present invention may be applied.

In FIG. 14, a hatched area indicates a transmission area of a physical channel (e.g., PDCCH) for DCI delivery and a black part indicates a transmission area of the physical channel (e.g., PUCCH) for Uplink Control Information (UCI) delivery.

The control information delivered by the eNB to the UE via the DCI may include information on the cell configuration which the UE should know, DL specific information such as DL scheduling, and/or UL specific information such as a UL grant. Further, the control information by the UE to the eNB via the UCI may include an ACK/NACK report for HARQ for DL data, CSI report for a DL channel state, and/or a scheduling request (SR).

In FIG. 14, an unmark area may be used a physical channel (e.g., PDSCH) transmission area for downlink data and or used as a physical (e.g., PUSCH) transmission area for uplink data. Such a structure is characterized in that DL transmission and UL transmission are sequentially performed in one subframe (SF), and DL data is transmitted in the corresponding SF, and UL ACK/NACK may be received. As a result, according to such a structure, it takes less time to retransmit data when a data transmission error occurs, thereby minimizing the latency of final data delivery.

In such a self-contained subframe structure, there is a need for a time gap between the eNB and the UE for the conversion process from the transmission mode to the reception mode or from the reception mode to the transmission mode. To this end, some OFDM symbols at the time of switching from DL to UL in the subframe structure may be configured to a guard period (GP) and such a subframe type may be referred to as a 'self-contained SF'.

Analog Beamforming

In the millimeter wave (mmW), the wavelength is shortened, so that a plurality of antenna elements may be installed in the same area. That is, a total of 64 antenna elements can be installed in a 2-dimensional array at a 0.5 lambda (i.e., wavelength) interval on a panel of 5×5 cm (alternatively, 5 by 5 cm) with a wavelength of 1 cm in a 30 GHz band. Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource. However, when the TXRUs are installed on all 100 antenna elements, there is a problem in that effectiveness is deteriorated in terms of costs. Therefore, a method of mapping a plurality of antenna elements to one TXRU and adjusting a direction of a beam using an analog phase shifter is considered. Such an analog beamforming method has a disadvantage in that frequency selective beamforming cannot be performed by making only one beam direction in all bands.

A hybrid BF with B TXRUs, which is an intermediate form of digital BF and analog BF, and fewer than Q antenna elements, can be considered. In this case, although there is a difference depending on a connection method of B TXRUs and Q antenna elements, the number of directions of the beams that can be transmitted at the same time is limited to B or less.

Further, in a New RAT system, when multiple antennas are used, a hybrid beam forming technique combining digital beam forming and analog beam forming is emerging. In this case, the analog beamforming (or radio frequency (RF) beamforming) means an operation of performing precoding (or combining) in an RF stage. In the hybrid beamforming, each of a baseband stage and the RF stage perform precoding (or combining), thereby reducing the number of RF chains and the number of digital (D)/analog (A) converters and achieving performance close to the digital beamforming. For convenience, the hybrid beamforming structure may be represented by N transceiver units (TXRU) and M physical antennas. Then, the digital beamforming for L data layers to be transmitted by the transmitter may be represented by an N by L matrix, and then the N digital signals converted are converted into an analog signal via the TXRU and then applied the analog beamforming represented by an M by N matrix.

Figure 15:
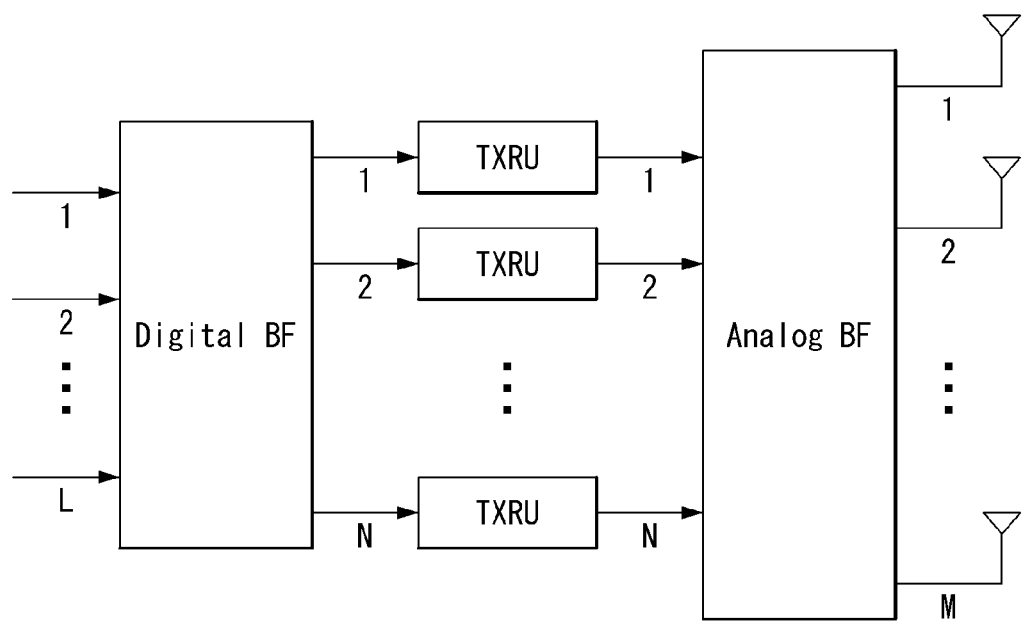
FIG. 15 is a schematic diagram of a hybrid beamforming structure in terms of TXRU and a physical antenna in a wireless communication system to which the present specification may be applied.

FIG. 15 is a diagram illustrating a hybrid beamforming structure in terms of TXRU and a physical antenna in a wireless communication system to which the present specification may be applied.

In FIG. 15, a case where the number of digital beams is L and the number of analog beams is N is illustrated.

In the New RAT system, considered is a direction in which it is designed so that the BS may change the analog beamforming by the unit of the symbol to support more efficient beamforming to a UE positioned in a specific region. Furthermore, in FIG. 15, when N specific TXRUs and M specific RF antennas are defined as one antenna panel, a scheme that introduces a plurality of antenna panels capable of independent hybrid beamforming is also considered in the New RAT system.

When the eNB uses a plurality of analog beams, analog signals favorable for signal reception may different each UE, and as a result, a beam sweeping operation is considered, which allows all UEs to have a reception opportunity by changing a plurality of analog beams which the eNB is to apply for each symbol in a specific subframe (SF) at least with respect to a synchronization signal, system information, paging, etc.

Figure 16:
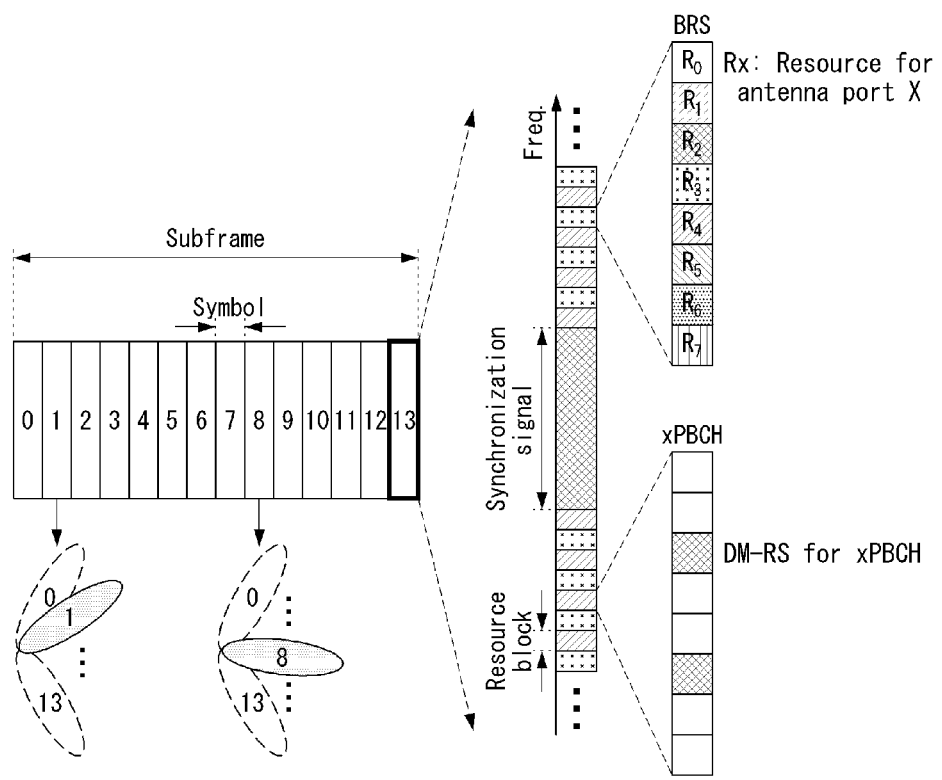
FIG. 16 is a schematic diagram of a beam sweeping operation for a synchronization signal and system information in a downlink transmission process in a wireless communication system to which the present invention may be applied.

FIG. 16 is a schematic diagram of a beam sweeping operation for a synchronization signal and system information in a downlink transmission process in a wireless communication system to which the present invention may be applied.

In FIG. 16, a physical resource (or physical channel) through which the system information is transmitted in a broadcasting scheme in the New RAT is referred to as physical broadcast channel (xPBCH).

Referring to FIG. 16, analog beams which belong to different antenna panels may be simultaneously transmitted in one symbol. In order to measure the channel for each analog beam, a method is discussed, which introduces a beam RS (BRS) which is a reference signal (RS) in which a single analog beam (corresponding to a specific antenna panel) is applied and transmitted as illustrated in FIG. 16. The BRS may be defined for a plurality of antenna ports and each antenna port of the BRS may correspond to the single analog beam. In this case, unlike the BRS, the synchronization signal or xPBCH may be transmitted, to which all of the analog beams in the analog beam group are applied so as to be well received by random UEs.

Radio Resource Management (RRM) Measurement

The LTE system supports RRM operations for power control, scheduling, cell search, cell reselection, handover, radio link or connection monitoring, connection establishment/re-establishment, etc. The serving cell may request RRM measurement information, which is a measurement value for performing the RRM operations, to the UE. Representatively, in the LTE system, the UE may measure/acquire information including cell search information for each cell, reference signal received power (RSRP), reference signal received quality (RSRQ), and the like and report the measured information to the eNB. Specifically, in the LTE system, the UE receives a measurement configuration ('measConfig') as a higher layer signal for RRM measurement from the serving cell. The UE may measure RSRP or RSRQ according to information of the 'measConfig'. Here, the definition of the RSRP, the RSRQ, and the received signal strength indicator (RSSI) according to TS 36.214 document of the LTE system is as follows.

1) RSRP

The reference signal received power (RSRP) is defined as a linear average in power contributions ([W]) of a resource element delivering a cell-specific RS (CRS) within a considered measurement frequency bandwidth. For RSRP determination the cell-specific reference signals R0 according TS 36.211 [3] shall be used. When the UE may reliably detect that R1 is available, the UE may determine the RSRP by using R1 in addition to R0.

The reference point for the RSRP shall be the antenna connector of the UE.

When receiver diversity is used by the UE, a reported value need not be smaller than the RSRP corresponding to a random individual diversity branch.

2) RSRQ

The reference signal received quality (RSRQ) is defined as a ratio N×RSRP/(E-UTRA carrier RSSI) (i.e., E-UTRA carrier RSSI to N×RSRP) and N represents the number of RBs of an E-UTRA carrier RSSI measurement bandwidth. The measurements in the numerator and denominator shall be made over the same set of resource blocks.

An E-UTRA Carrier Received Signal Strength Indicator (RSSI) may include the linear average of the total received power (in [W]) observed/measured by the UE only in OFDM symbols containing reference symbols for antenna port 0, in the measurement bandwidth, over N number of resource blocks from all sources, including co-channel serving and non-serving cells, channel interference, thermal noise etc. When the higher layer signaling represents a specific subframe for performing the RSRQ measurement, the RSSI may be measured for all OFDM symbols in the indicated subframe.

The reference point for the RSRP shall be the antenna connector of the UE.

When receiver diversity is used by the UE, a reported value need not be smaller than the RSRQ corresponding to a random individual diversity branch.

3) RSSI

The RSSI may correspond to received broadband power including thermal noise and noise generated at the receiver within a bandwidth defined by a receiver pulse shaping filter.

The reference point for measuring the RSSI should be the antenna connector of the UE.

When receiver diversity is used by the UE, a reported value need not be smaller than the UTRA carrier RSSI corresponding to a random individual receiving antenna branch.

According to such a definition, the UE which operates in the LTE system may be allowed to measure the RSRP in a bandwidth corresponding to one of 6, 15, 25, 50, 75, and 100 resource blocks (RBs) through an information element (IE) related with an allowed measurement bandwidth transmitted system information block type 3 (SIB3) in the case of intra-frequency measurement and through an allowed measurement bandwidth transmitted in system information block type 5 (SIB5) in the case of inter-frequency measurement. Alternatively, in the absence of such an IE, the UE may perform measurement in a frequency band of the entire downlink (DL) system by default. In this case, when the UE receives an allowed measurement bandwidth, the UE may consider the corresponding value as a maximum measurement bandwidth and arbitrarily measure the value of the RSRP within the corresponding bandwidth/value. However, when the serving cell transmits an IE defined as WB-RSRQ and the allowed measurement bandwidth is set to 50 RB or more, the UE needs to calculate the RSRP value for the entire allowed measurement bandwidth. Meanwhile, the RSSI may be measured in the frequency band of the receiver of the UE according to the definition of the RSSI bandwidth.

Figure 17:
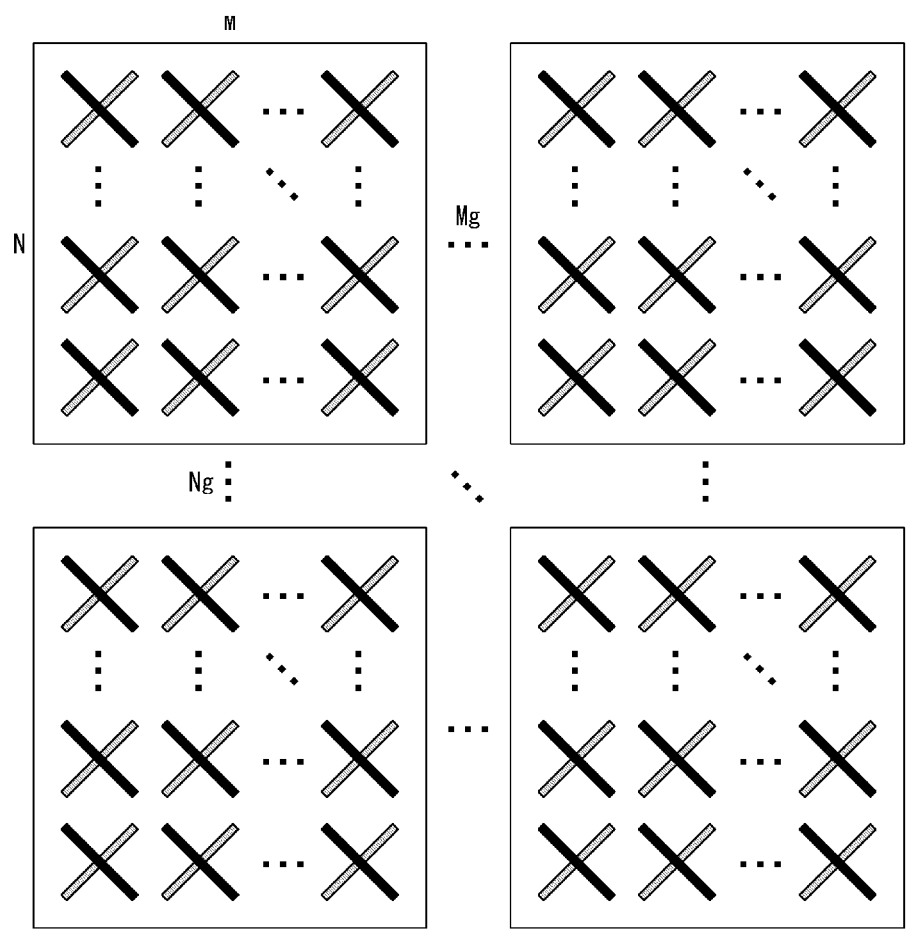
FIG. 17 illustrates a panel antenna array to which the present invention may be applied.

FIG. 17 illustrates a panel antenna array to which the present invention may be applied.

Referring to FIG. 17, each panel antenna array may be constituted by Mg panels as a horizontal domain and Ng panels as a vertical domain and each one panel may be constituted by M columns and N rows. In particular, in this figure, the panel is illustrated based on a cross polarization (X-pol) antenna. Accordingly, the total number of antenna elements in FIG. 17 may be 2*M*N*Mg*Ng.

Composition and Method of the Invention

As described above, in an environment such as New RAT, a self-contained structure is being considered. The self-contained structure in which downlink (DL) and uplink (UL) structures are aggregated and defined may have a structure illustrated in FIG. 18 below.

Figure 18:
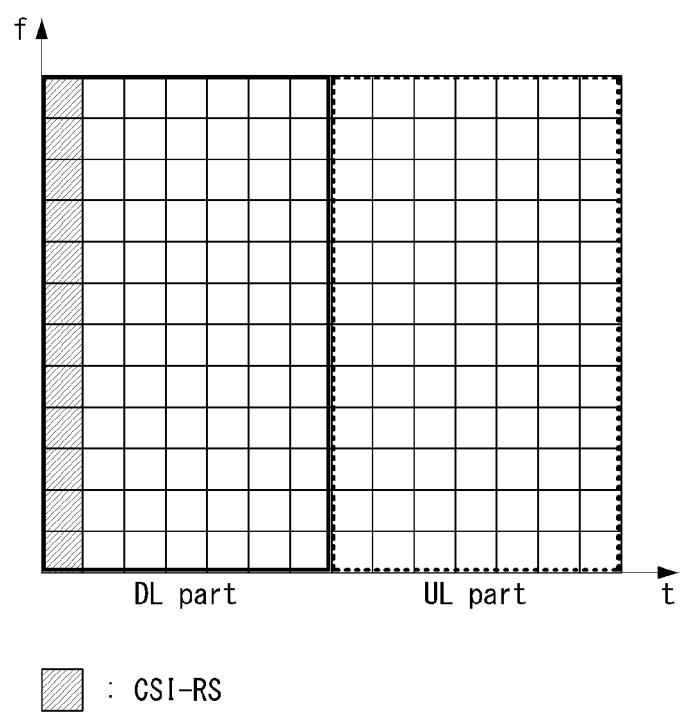
FIG. 18 illustrates a self-contained subframe structure having a CSI-RS symbol in a wireless communication system to which the present invention may be applied.

FIG. 18 illustrates a self-contained subframe structure having a CSI-RS symbol in a wireless communication system to which the present invention may be applied.

As illustrated in FIG. 18, in the subframe of the self-contained structure, the CSI-RS may be transmitted in one OFDM symbol (OS) or transmitted in multiple (consecutive or non-consecutive) OSs.

Here, the number of OSs configured for the UE may be defined as L. The eNB may configure the number of OSs for the UE. For example, the number of OSs may be configured semi-statically or may be dynamically configured differently for each subframe.

The CSI-RS may be used for a variety of purposes, for example, may be used for the purpose of channel (e.g., DL channel) measurement between the eNB and the UE, the use of beam refinement using beamformed CSI-RS, and for the purpose of management of analog transmit (analog TX) and/or reception (RX) beams.

Figure 19:
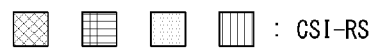
FIG. 19 illustrates a consecutive OFDM symbol or a non-consecutive symbol for CSI-RS transmission according to an embodiment of the present invention.
Figure 19:
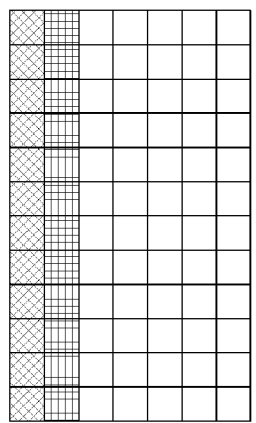
Figure 19:
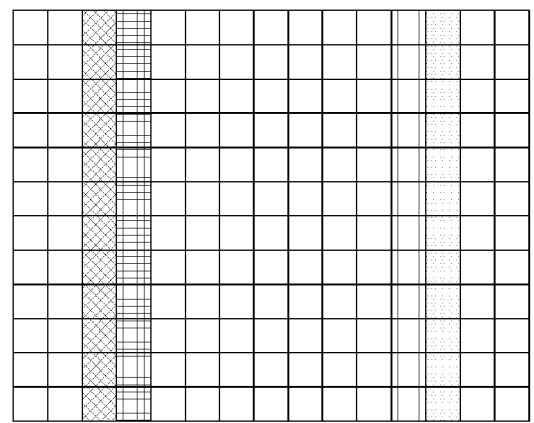

FIG. 19 illustrates a consecutive OFDM symbol or a non-consecutive symbol for CSI-RS transmission according to an embodiment of the present invention.

FIG. 19 illustrates locations of a plurality of OFDM symbols for CSI-RS transmission. FIG. 19(a) illustrates a case where the CSI-RS is transmitted in two consecutive symbols (i.e., OSs 0 and 1 in FIG. 19(a)) when one slot is constituted by 7 OFDM symbols and FIG. 19(b) illustrates a case where the CSI-RS is transmitted in four non-consecutive symbols (i.e., OSs 2, 3, 12, and 13 in FIG. 19(b)) when one slot is constituted by 14 OFDM symbols.

As illustrated above, a slot size may be constituted by 7 or 14 OSs. Information on the slot size may be pre-agreed between the UE and the eNB or the eNB may inform the UE of the information over the higher layer signaling (e.g., RRC layer signaling or a Control Element (MAC)).

As illustrated in FIG. 19, the plurality of OSs in which the CSI-RS is transmitted may be consecutive or non-consecutive regardless of the slot size.

When the plurality of OSs in which the CSI-RS is transmitted is consecutive, there are advantages of convenience of design of the CSI-RS and easiness of application such as CSM-x (e.g., x=2, 4, 8, . . . ), but the degree of freedom of flexibility of the CSI-RS to the UE is lowered in terms of the network. On the other hand, when the plurality of OSs in which CSI-RS is transmitted are is configured/applied non-consecutively, there is an advantage that the degree of freedom of the flexibility of the CSI-RS allocation may be increased.

In this case, as an example of a scheme of configuring/applying the location of the symbol in which the CSI-RS is transmitted (in particular, when the CSI-RS is transmitted in the non-consecutive symbols), the eNB may configure (indicate) an index(es) of OS(s) in which the CSI-RS is transmitted (mapped) over the higher layer signaling (e.g., RRC layer signaling or MAC CE) or the CSI-RS may be agreed between the UE and the eNB in advance.

Alternatively, OSs to which the CSI-RS is transmitted (mapped) may be configured at a regular interval. In this case, for example, the eNB may configure for the UE parameters related to the index of a first OS, and the number of all OSs (for example, L=1, 2, 3, 4, . . . ), and an interval of the OS symbol. In this case, when the CSI-RS is transmitted (mapped) to the consecutive OSs, the index of the first OS and the number of all OSs may be configured for the UE over the higher layer signaling (e.g., RRC layer signaling or MAC CE) or may be agreed between the UE and the eNB in advance.

The CSI-RS may be transmitted to the UE via 1, 2, 4, 8, 12, 24, and 32-ports (or a subset thereof).

The CSI-RSs may be configured using CDM-2, 4 or 8 or (no CDM).

Further, in a CSI-RS pattern (i.e., locations of REs in which the CSI-RS of the N-port is transmitted) of the N-port, 'M RE(s) (N>M, M=1 and/or 2 and/or 4 and/or 8)' may be aggregated and configured. In other words, the locations of the REs for transmission of the CSI-RS of the N-port may be determined in units of M REs.

In this specification, the N-port CSI-RS pattern may refer to a combination of REs to which the CSI-RS transmitted on N CSI-RS ports is mapped. For example, a 1-port CSI-RS pattern may refer to a combination of M REs (M≥1) to which the CSI-RS transmitted on one CSI-RS port is mapped. Further, an 8-port CSI-RS pattern may refer to a combination of RE(s) to which the CSI-RS transmitted on 8 CSI-RS ports is mapped. In this case, as described above, the 8-port CSI-RS pattern may be configured by aggregating four '2 REs'.

Further, a fact that the CSI-RS is transmitted (mapped) in a specific RE may be interpreted as a fact that a CSI-RS sequence is mapped and transmitted to the corresponding RE.

According to M, the N-port CSI-RS pattern may be mapped to a CDM-M pattern. That is, the CSI-RSs transmitted on M CSI-RS ports may be CDMed for each of 'M REs'. In addition, a plurality of 'M REs' is aggregated to configure the N-port CSI-RS pattern. The detailed description thereof will be made later.

A basic unit (i.e., a basic unit to which the CSI-RS transmitted on one antenna port is mapped) constituting the N-port CSI-RS pattern may be constituted by 'M REs'. Here, 'M REs' may be referred to as a CSI-RS component.

Here, N antenna port information (i.e., antenna port number) and M REs (M≥1) configured for the UE may be agreed between the UE and the eNB or configured for the UE over the higher layer signaling (e.g., RRC layer signaling or MAC CE) by the eNB. Alternatively, a specific value (e.g., M=2) among the M values may be agreed and used between the UE and the eNB.

In the case of the N-port CSI-RS pattern constituted by the plurality of M REs, when the same QuasiCo-Located (QCL) assumption is configured, the UE may expect that the eNB performs transmission by using one panel or a calibrated panel antenna array.

First, for convenience of description, a case of M=1 (i.e., the N-port CSI-RS pattern is configured in units of one RE) will be described.

As the case of M=1, a case where each analog beam is mapped to one port and used for beam management may be considered. When M=1 is configured/applied to beam management, the UE may not expect that CDM-x (x>=2) or more is applied. That is, in the case of M=1, CDM may not be applied for CSI-RS transmission. In this case, the CSI-RS on each CSI-RS port may be transmitted (mapped) for each one RE.

Figure 20:
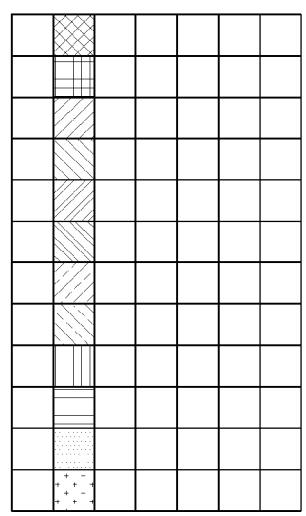
FIG. 20 illustrates a CSI-RS pattern for beam sweeping according to an embodiment of the present invention.

FIG. 20 illustrates a CSI-RS pattern for beam sweeping according to an embodiment of the present invention.

FIG. 20 illustrates a CSI-RS pattern in one slot (in addition, one PRB) in the case of M=1 and N=12.

In FIG. 20, it is illustrated that 12 1-port CSI-RS patterns (i.e., each CSI-RS element is 1 RE) exist in one OS. A case where the 12-port (i.e., N=12) CSI-RS is configured by aggregation in units of M=1 (i.e., 1 RE) and a total of 12 TX beams are configured is illustrated.

Each one TX beam may be mapped to each one CSI-RS port and transmitted. The UE may perform beam sweeping by measuring each CSI-RS port (i.e., measurement of the CSI-RS transmitted on the CSI-RS port).

Here, although FIG. 20 illustrates that CSI-RS patterns 0 to 11 are mapped to CSI-RS ports 0 to 11 for convenience of description, the present invention is not limited thereto, and it is apparent that CSI-RS patterns 0 to 11 are mapped to CSI-RS ports 15 to 26 like the example of LTE.

In the case where the number of sweeping Tx beams (N_Beam) is greater than the number of CSI-RS ports, the case may be classified into two cases as follows.

1. Extension to Time Axis

A. When N_beam is larger than the number of 12 subcarriers, the plurality of OSs is configured for the UE, so that a greater number of beam sweepings may be performed.

Figure 21:
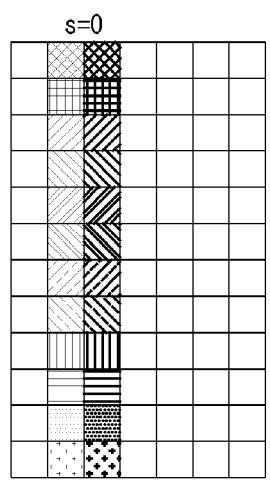
FIG. 21 illustrates a CSI-RS pattern for beam sweeping to which time domain extension is applied according to an embodiment of the present invention.
Figure 21:
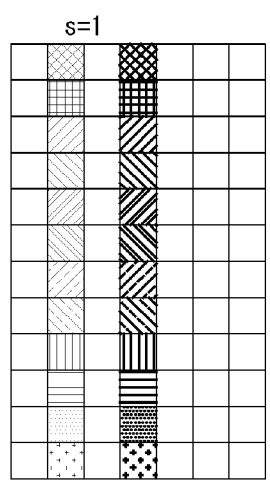

FIG. 21 illustrates a CSI-RS pattern for beam sweeping to which time domain extension is applied according to an embodiment of the present invention.

FIG. 21 illustrates a CSI-RS pattern in one slot (in addition, one PRB) in the case of M=1 and N=24.

In this case, the number of OSs configured for the UE may be given by $$\left\lceil \frac{N_{Beam}}{N} \right\rceil.$$

The eNB may configure the value for the UE over the higher layer signaling (e.g., RRC layer signaling or MAC CE) semi-statically or configure the value over the DCI, etc., dynamically.

As described above, the plurality of OSs configured for the UE may be consecutive as illustrated in FIG. 21(a) or non-consecutive as illustrated in FIG. 21(b).

When the plurality of OSs is configured to be non-consecutive, the eNB may configure an interval (e.g., parameter s) among the OSs for the UE or an interval between the OSs which is agreed between the eNB and the UE in advance may be used, by considering a capability (phase shift change latency, etc.) of the eNB.

In FIG. 21, 24 Tx beams are illustrated, but the present invention is not limited thereto and may be extended to more normal N_Beam.

B. As another embodiment, a case where the eNB repeatedly transmits a TX beam in order to support RX beam sweeping of the UE may be considered.

Figure 22:
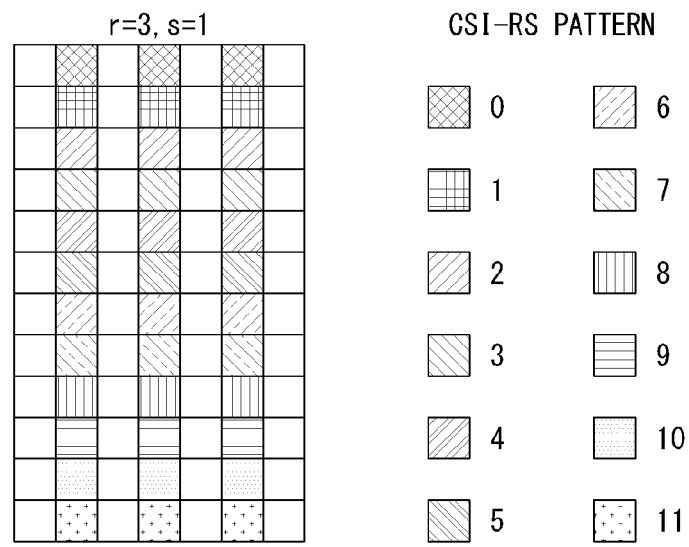
FIG. 22 illustrates a CSI-RS pattern for beam sweeping to which time domain extension is applied according to an embodiment of the present invention.

FIG. 22 illustrates a CSI-RS pattern for beam sweeping to which time domain extension is applied according to an embodiment of the present invention.

FIG. 22 illustrates a CSI-RS pattern in one slot (in addition, one PRB) in the case of M=1 and N=12.

In FIG. 22, parameter r represents a parameter indicating the number of OSs that repeatedly transmit the TX beam. In this case, a value of parameter r may be equal to the number of RX beams of the UE. In this case, the UE may feed back the number of RX beam sweepings to the eNB or notify the number of RX beam sweepings in capability reporting or the number of RX beam sweepings may be agreed in advance between the eNB and the UE.

Further, similarly to the case of A. above, the interval of the OSs repeatedly transmitted may be indicated by parameter s and the indicated interval as a value considering beam change latency of the UE may be agreed in advance between the UE and the eNB or configured for the UE by the eNB.

C. In the above example, parameter r may be assumed as the number of panels of the UE and reported to the eNB by the UE and in this case, the eNB may repeatedly transmit the CSI-RS by the value of r.

In this case, r is fed back by the UE, and the UE does not have a separate TXRU for each panel, and may perform panel selection through an operation such as TXRU switching. This is for the UE having a plurality of panel antennas to find an optimal RX beam in an optimal panel.

For example, a UE with two panels may select an optimal RX beam within a first panel by performing a Tx beam sweep using CSI-RS ports transmitted to a first OS. Further, the UE may select the optimal RX beam within a second panel by performing the Tx beam sweep using the CSI-RS ports transmitted to a second OS. In addition, finally, the UE may report to the eNB the optimal TX beam corresponding to the optimal panel.

D. In the example of B, the eNB may notify only the value of r to the UE (in this case, the UE recognizes s=0) and may instruct the UE to perform an RX beam sweep for a transmission time.

2. Extension to Frequency Axis (i.e., Lower Density)

Figure 23:
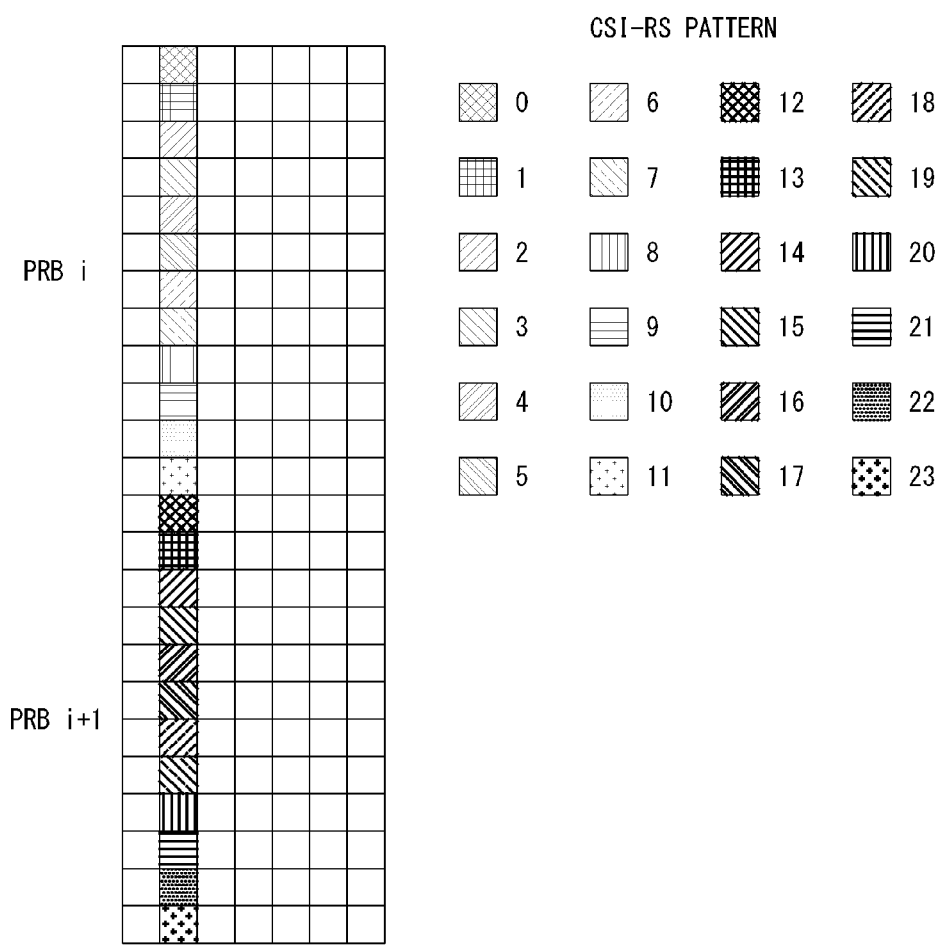
FIG. 23 illustrates a CSI-RS pattern for beam sweeping to which frequency domain extension is applied according to an embodiment of the present invention.

A. As illustrated in FIG. 23, when N_beam is larger than the number of 12 subcarriers, the number of physical resource blocks (PRBs) may be extended by the number of corresponding sweeping beams.

FIG. 23 illustrates a CSI-RS pattern for beam sweeping to which frequency domain extension is applied according to an embodiment of the present invention.

FIG. 23 illustrates a CSI-RS pattern in one slot (in addition, two PRBs) in the case of M=1 and N=24.

As illustrated in FIG. 23, when N_Beam is larger than the number of 12 subcarriers, the CSI-RS may be transmitted at a lower density (<1RE/RB/PRB) by extending the PRB by the number of sweeping beams.

In this case, the eNB may inform the UE of density information (e.g., d=1, 0.5, 0.25) and may perform the beam sweep using the CSI-RS port to which the Tx beam is mapped.

B. In order to perform the RX beam sweep, the eNB may repeatedly transmit a low density CSI-RS mixedly using a scheme of 1-B or 1-C described above.

C. Further, when N_Beam is very large, it is expected that the density of scheme described above 2 becomes too low and estimation performance deteriorates. Therefore, the time/frequency extension is used by mixedly using scheme 1-A described above to support the TX beam sweep.

In terms of implementation, one TXRU to which one TX beam is mapped is preferably configured by 2^x (x is an arbitrary integer). Therefore, the maximum number of beams (N'_Beam) that may be mapped and transmitted within one OS and 12 subcarriers may be configured to 2, 4, 8, and so on.

The eNB may configure the maximum number of beams (N'_Beam) for the UE over the higher layer signaling (e.g., RRC layer signaling or MAC CE). If TXRUs of 16, 32, . . . exceeding 8 are provided, the extension to the time axis or frequency axis proposed above may be applied for CSI-RS transmission.

In this case, in order to inform the locations of the REs with M=1, when the eNB signals a leading RE location (here, a leading RE means, for example, the location of the RE signaled by the eNB like the location of the RE signaled in order to notify a Y-port (Y=2, 4, 8) CSI-RS configuration in the LTE) and the N'_Beam to the UE, the UE may use consecutive N'_Beam REs from the leading RE location for the beam sweep. Alternatively, the leading RE location may be agreed in advance between the eNB and the UE as a specific value (e.g., OS #1 and subcarrier #0) and in this case, the eNB may signal only the N'_Beam value to the UE. Alternatively, the eNB may explicitly inform the UE of all N'_Beam RE locations for network flexibility.

When the number of TXRUs exceeds 8, the RE locations may be transmitted in a comb type like 2 described above and RE groups configured by M=1 which exists per PRB may be transmitted with different offsets.

As another scheme, since the number of TX beams is determined as $2_x$ X oversampling factor, one OS may be configured by using 2^x REs.

Further, one OS is extended to the time domain by the number of oversampling factors, and as a result, the CSI-RS pattern of M=1 may be configured for the purpose of the beam management.

Figure 24:
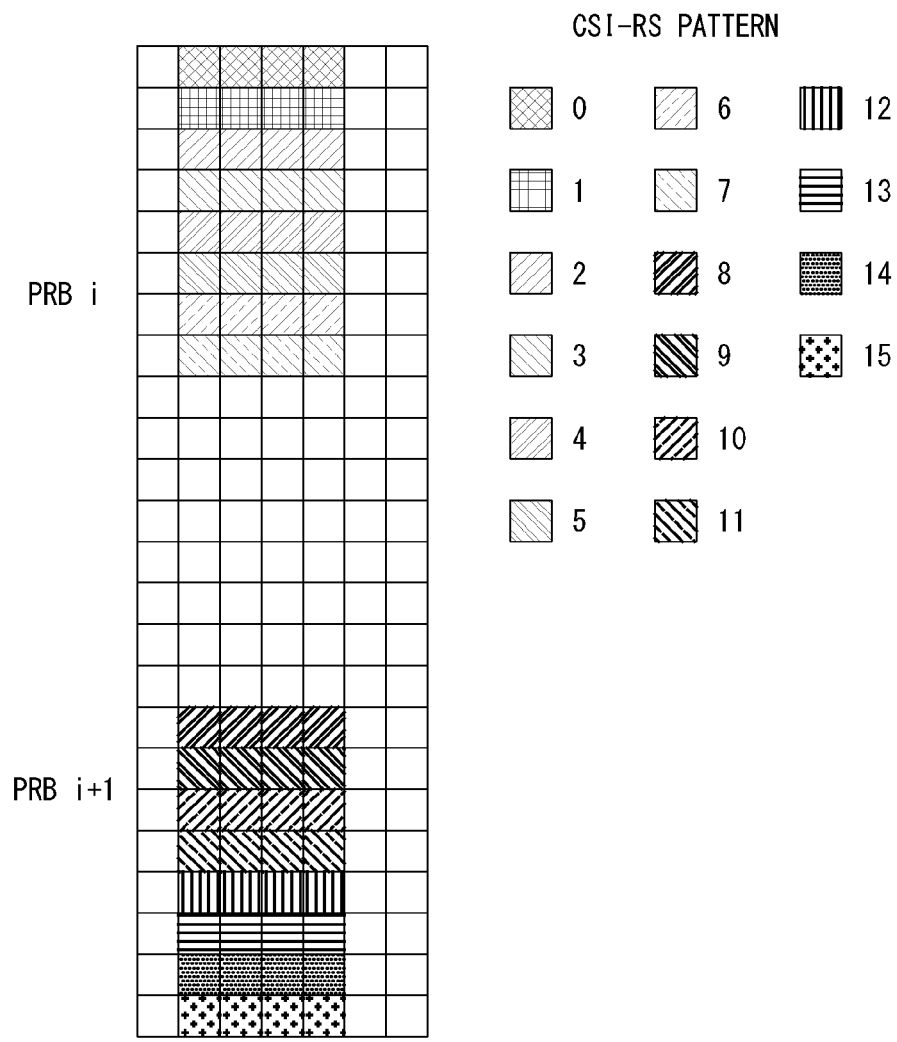
FIG. 24 illustrates a CSI-RS pattern for beam sweeping according to an embodiment of the present invention.

FIG. 24 illustrates a CSI-RS pattern for beam sweeping according to an embodiment of the present invention.

FIG. 24 illustrates a CSI-RS pattern in one slot (in addition, two PRBs) when the number of TXRUs is 16 (N=16) and the oversampling factor is 4.

As illustrated in FIG. 24, 16 respective TXRUs are differently beamformed and one Tx beam may be mapped to one RE. In one OS, 16 REs may be used and 16 beams may be transmitted. 16 respective REs are separated two 8 RE groups (N'_Beam=8), and a first group may be transmitted to an even RB with an offset (i.e., mapping from a first subcarrier of PRB i) of 0 and a second group may be transmitted to an odd RB with an offset (i.e., mapping from a 5-th subcarrier of PRB i+1) of 4. Further, since the total number of Tx beams is 64, the oversampling factor may be 4 and this may be tied with the number of OSs in which the same CSI-RS pattern is transmitted and the OSs may be consecutive or non-consecutive. When the OSs in which the CSI-RS pattern is mapped are non-consecutive, the OSs may be indicated to the UE as parameter s described above.

Hereinafter, a case of M=2 will be described.

Figure 25:
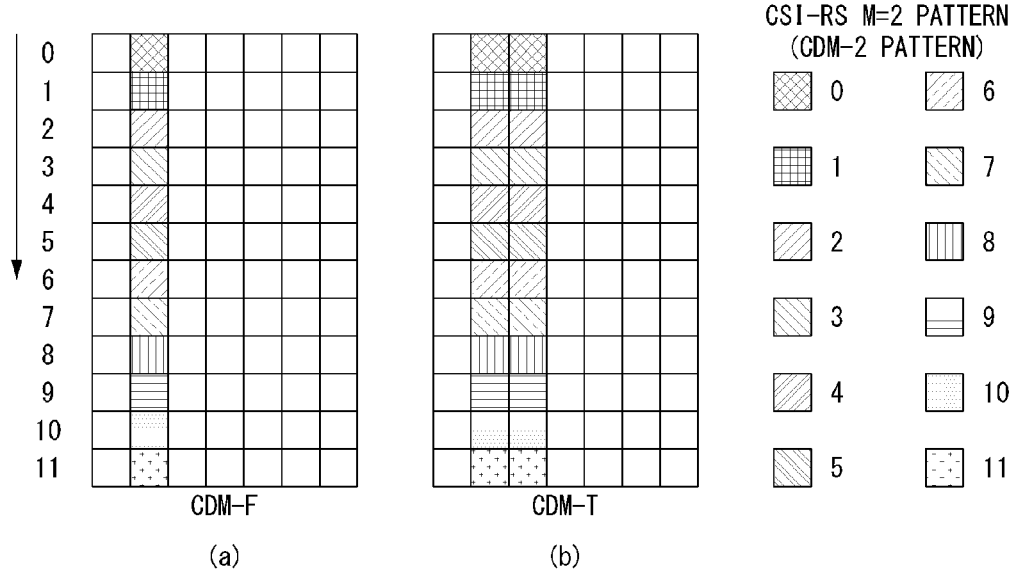
FIGS. 25 to 29 illustrate a CSI-RS pattern according to an embodiment of the present invention.

FIG. 25 illustrates a CSI-RS pattern according to an embodiment of the present invention.

FIG. 25(a) illustrates a 2-port CSI-RS pattern with M=2 in a frequency axis direction within one slot (in addition, one PRB) and FIG. 25(b) illustrates a 2-port CSI-RS pattern with M=2 in a time axis direction within one slot (in addition, one PRB).

Further, FIG. 25 illustrates a case where CDM-2 is applied for each 2-port CSI-RS pattern with M=2.

CDM-F may mean that CDM is applied (i.e., CSI-RSs on M CSI-RS ports are multiplexed) for each of M RE units (i.e., CSI-RS elements) (here, M REs may be consecutive or non-consecutive) in the frequency axis direction (frequency domain CDM). For example, as illustrated in FIG. 25(a), in the case of the CDM-F and M=2, the location of one CSI-RS pattern (i.e., CSI-RS element) may be (k, l), (k+1) (here, k represents a subcarrier index and l represents an OS index).

Further, CDM-T may mean that CDM is applied (i.e., CSI-RSs on M CSI-RS ports are multiplexed) for each of M RE units (i.e., CSI-RS elements) (here, M REs may be consecutive or non-consecutive) in the time axis direction (time domain CDM). For example, as illustrated in FIG. 25(b), in the case of the CDM-T and M=2, the location of one CSI-RS pattern (i.e., CSI-RS element) may be (k, l), (k, l+1) (here, k represents the subcarrier index and l represents the OS index).

Referring to FIG. 25(a), there are six CSI-RS patterns with M=2 in one OS. The respective patterns with M=2 may be classified/configured into subcarrier indexes (0, 2, 4, 6, 8, and 10 and in this case, may be each configured by the CSI-RS configuration).

Further, it may be agreed in advance that CDM-2 is configured in each RE with M=2 (i.e., CSI-RSs transmitted on two different antenna ports are mapped to the same RE with M=2).

Further, for a more flexible configuration, for example, when it is assumed that subcarrier index #1 and M=2 are configured, the UE may recognize/apply that the 2-port CSI-RS is configured by subcarriers #1 and #2. Further, when M=2, the UE may not expect to configure subcarrier #11. That is, in order to signal the RE with M=2 to the UE, the location of the leading RE may belong to subcarriers #0 to #10.

CDM-2 may be applied to a 2 RE CSI-RS pattern (i.e., CSI-RS element) with M=2 configured in the scheme described above. In this case, Walsh codes of [1, 1] and [1, −1] may be applied to the CDM-2.

In the case of M=2, K Ms are aggregated to constitute the N-port CSI-RS (e.g., N=4, 8, 12, 24, 32). In this case, the value of K corresponding to each N-port (i.e., N=4, 8, 12, 24, or 32) may be 2, 4, 6, 12, or 16. Here, when K is large, for example, 16 CSI-RS patterns (i.e., CSI-RS elements) with M=2 should be combined in order to a 32-port CSI-RS. In this case, a total of 32 REs are required for CSI-RS transmission and to this end, the minimum number of OSs to be configured corresponds to L=3. As a most flexible scheme, the network may configure the RE location (e.g., a frequency parameter (i.e., subcarrier index) and a time index (i.e., OS index)) of the CSI-RS pattern (i.e., CSI-RS element) with M=2 together with all parameters L, N, M, and K, but signaling overhead therefor may be significantly increased.

In order to solve such a disadvantage, when CDM-F and M=2 are configured, up to N'-ports (here, N'=2, 4, 6, 8, 12)

are configured/applied in one OFDM symbol and the N-port CSI-RS may be configured by aggregating a plurality of OSs constituted by the N'-port CSI-RS of the same location (pattern).

In this case, the N'-port CSI-RS in one OS may be indicated by configuring/applying a plurality of CSI-RS patterns or CSI-RS configurations with M=2. In this case, the number of used OSs may be defined as $$L = \frac{N}{N'}$$

and the UE may not expect that L is not an integer.

Therefore, when the plurality of OSs is consecutively configured, the eNB may notify the UE of N and N'. Further, when the CSI-RS is configured in the plurality of non-consecutive OSs, the eNB may additionally inform the UE of the OS index.

Referring to FIG. 25(b), there is shown an example in which the CSI-RS pattern with M=2 is configured over two OSs. In this case, the time domain CDM-2 may be applied. This is a similar structure to the existing LTE system and for signaling of M=2, each of the OS index and the index of the subcarrier may be configured.

CDM pattern information (i.e., CDM-F or CMF-T) to which each CDM-2 is applied may be configured for the UE over the higher layer signaling (e.g., RRC layer signaling or MAC CE) by the eNB or agreed in advance between the eNB and the UE.

Figure 26:
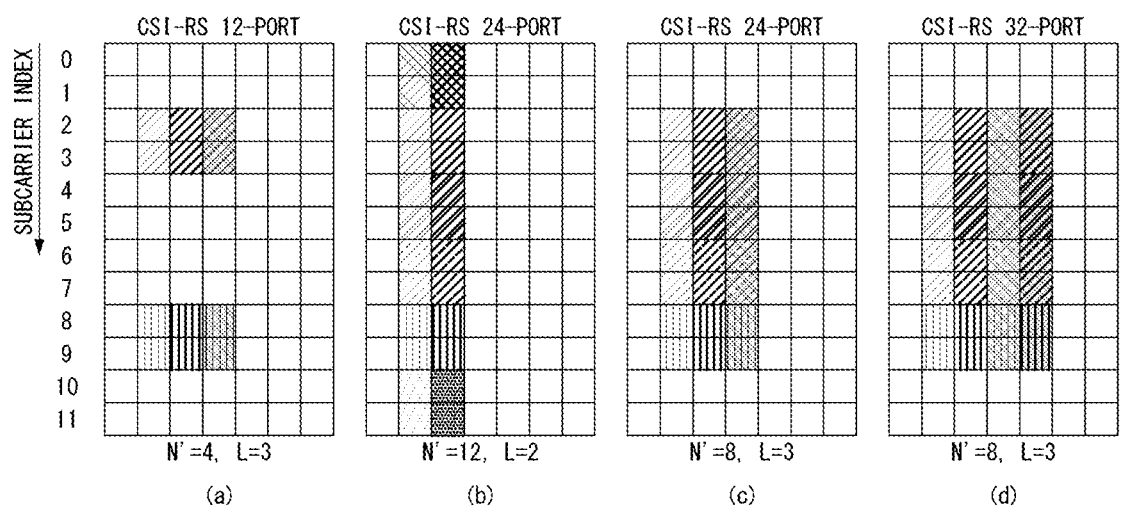

FIG. 26 is a diagram illustrating a CSI-RS pattern according to an embodiment of the present invention.

In FIG. 26, the 2-port CSI-RS pattern (i.e., CSI-RS element) with M=2 in the frequency axis direction in one slot (in addition, one PRB) for CSI-RS 12-port (FIG. 26(a)), CSI-RS 24-port (FIGS. 26(b) and 26(c)), and CSI-RS 32-port (FIG. 26(d)) is illustrated and a case in which the CDM-2 is applied for each 2-port CSI-RS pattern (i.e., CSI-RS element) with M=2 is illustrated (i.e., CDM-F).

As illustrated in FIG. 26(b), the CSI-RS using all the subcarriers of the OS symbols is more efficient for beam management. On the other hand, as illustrated in FIG. 26(c), since network flexibility is the higher in terms of a cell reuse factor, the CSI-RS may be suitable for CSI acquisition.

Therefore, the eNB may separate a CSI-RS configuration for beam management and a CSI-RS configuration for CSI acquisition and configure the separated configurations for the UE through separate signaling.

Figure 27:
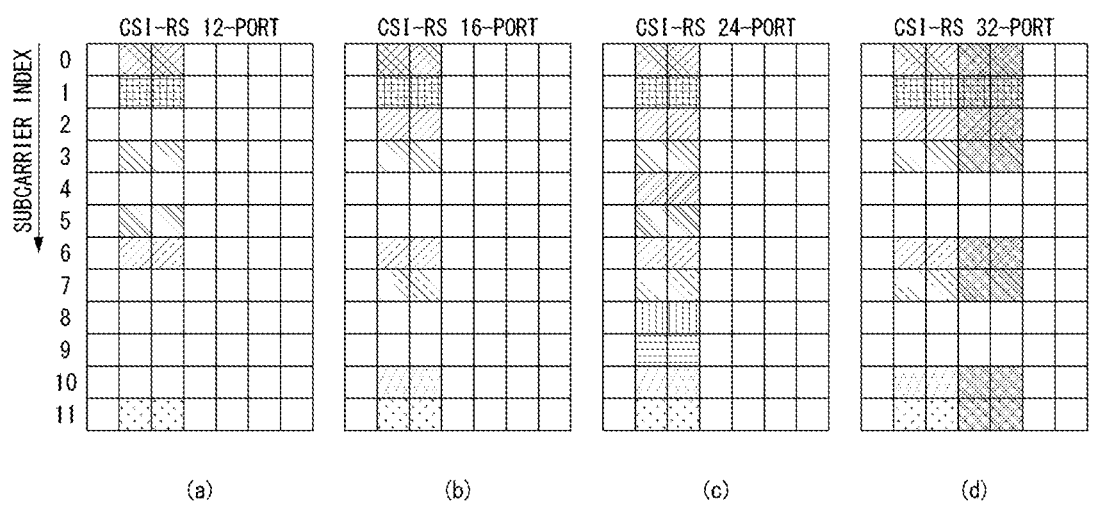

FIG. 27 is a diagram illustrating a CSI-RS pattern according to an embodiment of the present invention.

In FIG. 27, the 2-port CSI-RS pattern (i.e., CSI-RS element) with M=2 in the time axis direction in one slot (in addition, one PRB) for CSI-RS 12-port (FIG. 27(a)), CSI-RS 16-port (FIGS. 27(b) and 27(c)), and CSI-RS 24-port (FIG. 26(d)) is illustrated and a case in which the CDM-2 is applied for each 2-port CSI-RS pattern (i.e., CSI-RS element) with M=2 is illustrated (i.e., CDM-T).

Hereinafter, a case of M=4 will be described.

Figure 28:
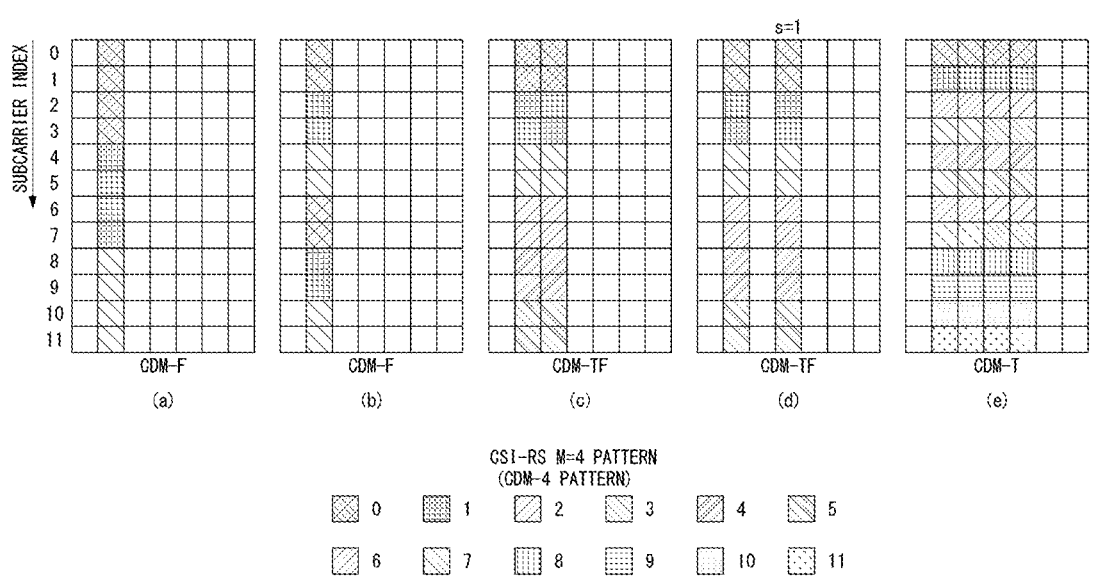

FIG. 28 is a diagram illustrating a CSI-RS pattern according to an embodiment of the present invention.

FIG. 28 illustrates a CSI-RS pattern in one slot (in addition, one PRB) in the case of M=4.

When M=4 is a basic unit (i.e., CSI-RS element) constituting the CSI-RS, N may be limited to be applied to 4 ports or more.

As illustrated in FIG. 28, when the M 4 is the basic unit, CDM-4 may be basically applied. In this case, a pattern for the CDM-4 may be divided into three types such as CDM-F (FIGS. 28(a) and 28(b)), CDM-TF (FIGS. 28(c) and 28(d)), and CDM-T (FIG. 28(e)).

As described above, the CDM-F may mean that the CDM is applied (i.e., CSI-RSs on M CSI-RS ports are multiplexed) for each of M RE units (i.e., CSI-RS elements) (here, M REs may be consecutive or non-consecutive) in the frequency axis direction (i.e., frequency domain CDM). For example, as illustrated in FIG. 28(a), in the case of the CDM-F and M=4, the location of one CSI-RS pattern (i.e., CSI-RS element) may be (k, l), (k+1, l), (k+2, l), (k+3, l) (here, k represents the subcarrier index and l represents the OS index). Alternatively, as illustrated in FIG. 28(b), in the case of the CDM-F and M=4, the location of one CSI-RS pattern (i.e., CSI-RS element) may be (k, l), (k+1, l), (k+6, l), (k+7, l) (here, k represents the subcarrier index and l represents the OS index).

Further, the CDM-TF may mean that the CDM is applied (i.e., CSI-RSs on M CSI-RS ports are multiplexed) for each of M RE units (i.e., CSI-RS elements) (here, M REs may be consecutive or non-consecutive) in the time axis and frequency axis directions (i.e., frequency and time domain CDM). For example, as illustrated in FIG. 28(c), in the case of the CDM-TF and M=4, the location of one CSI-RS pattern (i.e., CSI-RS element) may be (k, l), (k+1, l), (k, l, l), (k+1, l+1) (here, k represents the subcarrier index and l represents the OS index). Alternatively, as illustrated in FIG. 28(d), in the case of the CDM-TF and M=4, the location of one CSI-RS pattern (i.e., CSI-RS element) may be (k, l), (k+1, l), (k, l+2), (k+1, l+2) (here, k represents the subcarrier index and l represents the OS index).

Further, the CDM-T may mean that the CDM is applied (i.e., CSI-RSs on M CSI-RS ports are multiplexed) for each of M RE units (i.e., CSI-RS elements) (here, M REs may be consecutive or non-consecutive) (M REs are positioned in the same subframe) in the time axis direction (i.e., time domain) (i.e., time domain CDM). For example, as illustrated in FIG. 28(e), in the case of the CDM-T and M=4, the location of one CSI-RS pattern (i.e., CSI-RS element) may be (k, l), (k, 1, l), (k, l+2), (k, l+3) (here, k represents the subcarrier index and l represents the OS index).

In this case, for signaling each CSI-RS pattern (i.e., CSI-RS element), the eNB may signal to the UE information of M and a representative value (e.g., the subcarrier index and the OS index) of the location of the RE of each pattern. Further, each CSI-RS pattern information with M=4 or CDM pattern information (i.e., CDM-F, CMF-T, or CDM-TF) to which the CDM-4 is applied may notified to the UE over the higher layer signaling (e.g., RRC layer signaling or MAC control element (CE)) by the eNB or agreed in advance between the UE and the eNB.

Here, in the case of the CDM-F, since it may difficult to implement full power utilization in the 16-port, the CDM-F may be used only for the 12-port.

In the case of M=4, the scheme of M=2 described above may be similarly applied to a scheme of applying the CDM-2. That is, a CSI-RS pattern (i.e., CSI-RS element) with M=4 may be divided into two groups with M=2 and the CDM-2 may be applied to each group.

Alternatively, the CDM-2 may be applied to each of two CDM-2 groups, which may be appreciated as CDM aggregation constituting the CDM-4 by using Equation 15 below.

In other words, M=4 RE units are divided into two subgroups (i.e., M=2 RE and CDM-2 groups), the CDM-2 may applied to each subgroup, and the CDM-2 may be applied over two subgroups. For example, when M=4 RE units are divided into two subgroups, the frequency/time domain CDM-2 may be applied to each subgroup, and the time/frequency domain CDM-2 may be applied over two subgroups. That is, the frequency/time domain CDM-2 and the time/frequency domain CDM-2 are combined to apply the CDM-4.

$$\begin{bmatrix} 1 & 1 \\ 1 & -1 \end{bmatrix} \otimes \begin{bmatrix} 1 & 1 \\ 1 & -1 \end{bmatrix}$$ [Equation 15]

A more detailed description for the CSI-RS port to which a weight vector of the CDM-4 configured in Equation 15 is applied will be described below in a port indexing part.

Since the number of CSI-RS patterns (i.e., CSI-RS elements) which exists in one OS in the case of M=4 is smaller than that in the case of M=2, a signaling amount for information on each CSI-RS pattern is reduced, and as a result, there is a gain in terms of signaling overhead.

Hereinafter, a case of M=8 will be described.

Figure 29:
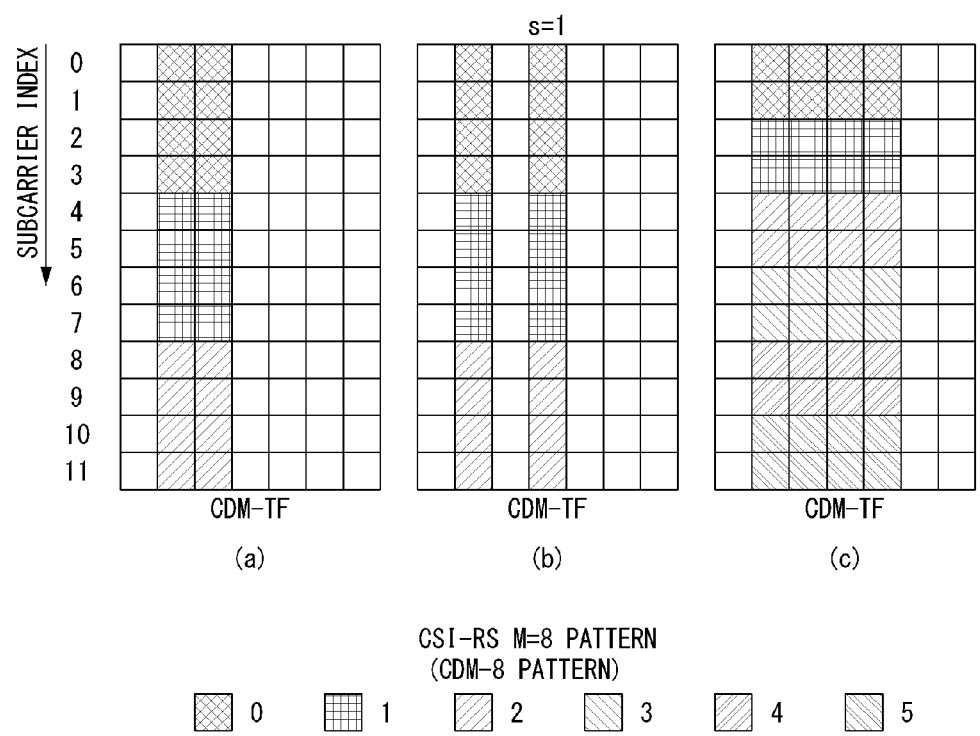

FIG. 29 is a diagram illustrating a CSI-RS pattern according to an embodiment of the present invention.

FIG. 29 illustrates a CSI-RS pattern in one slot (in addition, one PRB) in the case of M=8.

When M=8 is a basic unit (i.e., CSI-RS element) constituting the CSI-RS, N may be limited to be applied to 8 ports or more.

As illustrated in FIG. 29, when the M=8 is the basic unit, CDM-8 may be basically applied. In this case, the resulting pattern may be configured by the CDM-TF.

As described above, the CDM-TF may mean that the CDM is applied (i.e., CSI-RSs on M CSI-RS ports are multiplexed) for each of M RE units (i.e., CSI-RS elements) (here, M REs may be consecutive or non-consecutive) in the time and frequency axis directions. For example, as illustrated in FIG. 29(a), in the case of the CDM-TF and M=4, the location of one CSI-RS pattern (i.e., CSI-RS element) may be (k, l), (k+1, l), (k+2, l), (k+3, l), (k, l, l), (k+1, l+1), (k+2, l+1), (k+3, l+1) (here, k represents the subcarrier index and l represents the OS index). Alternatively, as illustrated in FIG. 29(b), in the case of the CDM-TF and M=8, the location of one CSI-RS pattern (i.e., CSI-RS element) may be (k, l), (k+1, l), (k+2, l), (k+3, l), (k, l+2), (k+1, l+2), (k+2, l+2), (k+3, l+2) (here, k represents the subcarrier index and l represents the OS index). Alternatively, as illustrated in FIG. 29(c), in the case of the CDM-TF and M=8, the location of one CSI-RS pattern (i.e., CSI-RS element) may be (k, l), (k+1, l), (k, l, l), (k+1, l+1), (k, l+2), (k+1, l+2), (k, l+3), (k+1, l+3) (here, k represents the subcarrier index and l represents the OS index).

Here, a case where the patter is configured by the CDM-T (i.e., a pattern in which CDM-8 is applied over 8 consecutive OSs in the same subcarrier) is also possible, but this may be limited to a case where one slot is constituted by 14 OSs. Further, the CDM-T may be applied to a case where a time domain variation is small or a coherence time is large.

In this case, for signaling each CSI-RS pattern (i.e., CSI-RS element), the eNB may signal to the UE information of M and a representative value (e.g., the subcarrier index and the OS index) of the location of the RE of each pattern. Further, each CSI-RS pattern information with M=8 or CDM pattern information (i.e., CMF-T or CDM-TF) to which the CDM-8 is applied may notified to the UE over the higher layer signaling (e.g., RRC layer signaling or MAC control element (CE)) by the eNB or agreed in advance between the UE and the eNB.

In the case of M=8, the scheme of M=4 described above may be similarly applied to a scheme of applying the CDM-4. That is, a CSI-RS pattern (i.e., CSI-RS element) with M=8 may be divided into two groups with M=4 and the CDM-2 may be applied to each group.

Alternatively, the CDM-4 may be applied to each of two CDM-2 groups, which may be appreciated as CDM aggregation constituting the CDM-8 by using Equation 16 below.

In other words, M=8 RE units are divided into two subgroups (i.e., M=4 RE and CDM-4 groups), the CDM-2 may applied to each subgroup, and the CDM-4 may be applied over two subgroups. For example, when M=8 RE units are divided into two subgroups, the frequency/time domain CDM-2 may be applied to each subgroup, and the time/frequency domain CDM-4 may be applied over two subgroups. That is, the frequency/time domain CDM-4 and the time/frequency domain CDM-2 are combined to apply the CDM-8.

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} \otimes \begin{bmatrix} 1 & 1 \\ 1 & -1 \end{bmatrix}$$ [Equation 16]

In addition, CDM-4 is applied to each group by dividing the CSI-RS pattern (i.e., CSI-RS element) with M=8 into four groups with M=2, and CDM aggregation may be used to configure the CDM-8 and this is shown in Equation 17 below.

In other words, M=8 RE units are divided into four subgroups (i.e., M=2 RE and CDM-4 groups), the CDM-2 may applied to each subgroup, and the CDM-4 may be applied over four subgroups. For example, when M=8 RE units are divided into four subgroups, the frequency/time domain CDM-2 may be applied to each subgroup, and the time/frequency domain CDM-4 may be applied over four subgroups. That is, the frequency/time domain CDM-2 and the time/frequency domain CDM-4 are combined to apply the CDM-8.

$$\begin{bmatrix} 1 & 1 \\ 1 & -1 \end{bmatrix} \otimes \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$ [Equation 17]

Hereinafter, a method for configuring the CDM-4 will be described.

Figure 30:
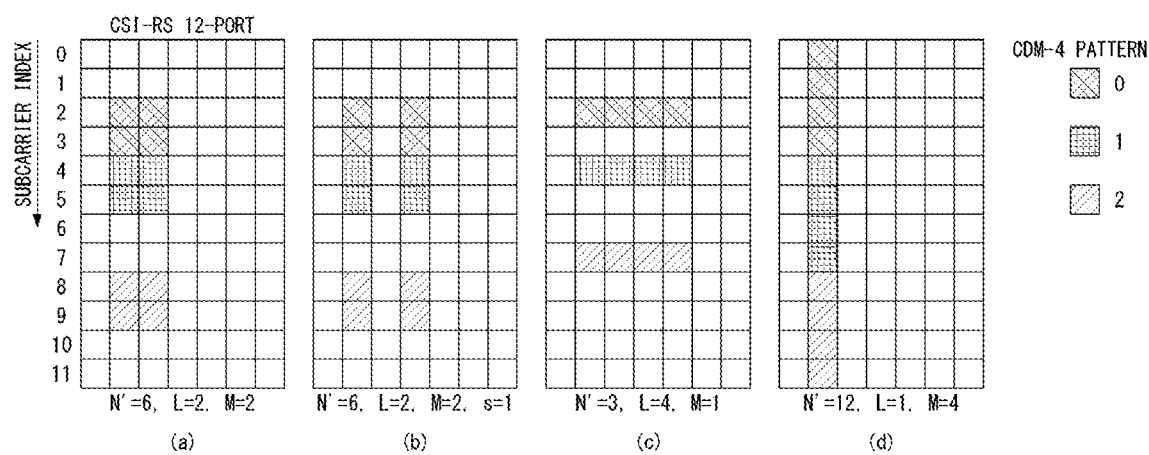
FIGS. 30 and 31 are diagrams illustrating a CSI-RS pattern to which CDM-4 is applied according to an embodiment of the present invention.
Figure 31:
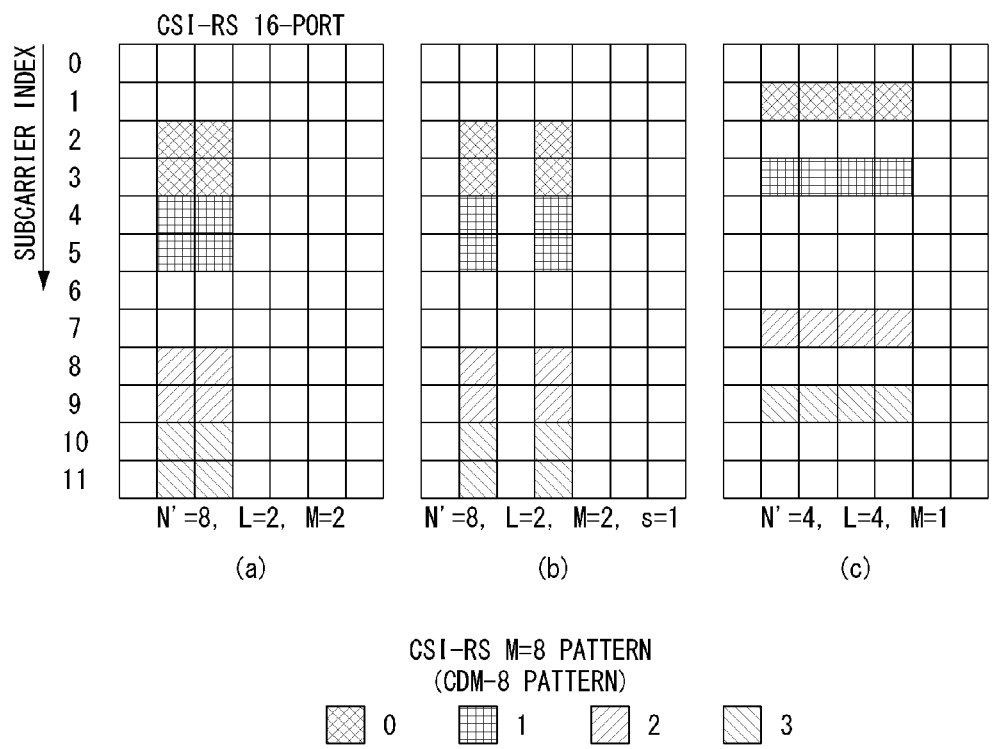

FIGS. 30 and 31 are diagrams illustrating a CSI-RS pattern to which CDM-4 is applied according to an embodiment of the present invention.

FIG. 30 illustrates a 12-port CSI-RS pattern in one slot (in addition, one PRB) and FIG. 31 illustrates a 16-port CSI-RS pattern in one slot (in addition, one PRB).

The introduction of a higher order orthogonal cover code (OCC) may be considered to enable full power utilization as the number of antenna ports N increases. For example, in the case of the CDM, values including 4, 6, 8, etc., may be considered. The reason is that when 6 dB is considered, which is a RAN4 CSI-RS power boosting limit of the current LTE, full power utilization may be impossible only by power boosting. For example, in the case of the 16-port, when the CDM-2 is applied, a final 9 dB gain may be achieved by obtaining a 6 dB gain by the power boosting and a 3 dB gain due to the CDM-2. However, when the CDM-4 is applied, an additional 3 dB gain is further obtained to achieve a final 13 dB gain. Accordingly, OCC having a high length helps to increase cell coverage.

In this case, since there is a gain in terms of a power gain in the 12-port or more, it may be limited that the CDM-4 is applied in the 12-port or more.

Here, the CDM-4 pattern for full power utilization may be divided into CDM-T and CDM-TF.

In the case of the CDM-T (FIGS. 30(c) and 31(c)), four REs to which the CDM-4 is applied may be limited to be applied to consecutive REs in the time domain. The reason is that only when there is no channel variation of the REs to which the CDM is applied, a performance gain due to the CDM may be obtained.

Further, the CDM-TF (FIGS. 30(a), 30(c), 31(a), and 31(b)) may be limited to be applied to 2×2 (2 by 2) REs in which channel variation is small similarly to the CDM-T.

Further, in the case of the CDM-F (FIG. 30(d)), the CDM-4 may be configured on the time axis.

Further, as an example of a method for signaling the CSI-RS pattern (i.e., CSI-RS element), the M value for the CDM pattern may be defined/agreed in advance (e.g., in the case of CDM-T, M=1, in the case of the CDM-TF, M=2, and in the case of the CDM-F, M=4) and the eNB may also implicitly configure the CDM pattern together by signaling the M value to the UE.

FIGS. 30(b) and 31(b) above illustrate a configuration of the N-port CSI-RS constituted by non-consecutive OSs. In this case, an interval (e.g., a value of parameter s) between the OSs is limited to 1 or 2 to maximize channel estimation performance. Alternatively, when the CSI-RS pattern is constituted by non-consecutive OSs, OCC having a length of 4 or more may be defined/agreed so as not to be applied.

For example, as the example of the weight vector to which the CDM-4 is applied, the weight vector may be configured by a Walsh code size of 4 as shown in Equation 18 below.

$W_0 = [1\ 1\ 1\ 1]$ $W_1 = [1\ -1\ 1\ -1]$ $W_2 = [1\ 1\ -1\ 1]$ $W_0 = [1\ -1\ -1\ 1]$ [Equation 18]

In the above description, for convenience of description, only the case of M=2 is primarily described, but in the case of M=4, the CDM-4 may be configured in units of the CSI-RS pattern (i.e., CSI-RS element) with M=4, of course.

Further, in the case of M=8, each CSI-RS pattern (i.e., CSI-RS element) may be divided into two groups and the CDM-4 may be applied/configured. In this case, each CDM pattern is connected to a value of L or a value of M, and as a result, the UE may implicitly configure the CDM pattern through the L value or the M value. For example, the CDM-F may be configured by signaling L=1 or M=4, the CDM-TF may be configured by signaling L=2 or M=2, and the CDM-T may be configured by signaling L=4 or M=1.

Hereinafter, CDM-6 will be described.

Figure 32:
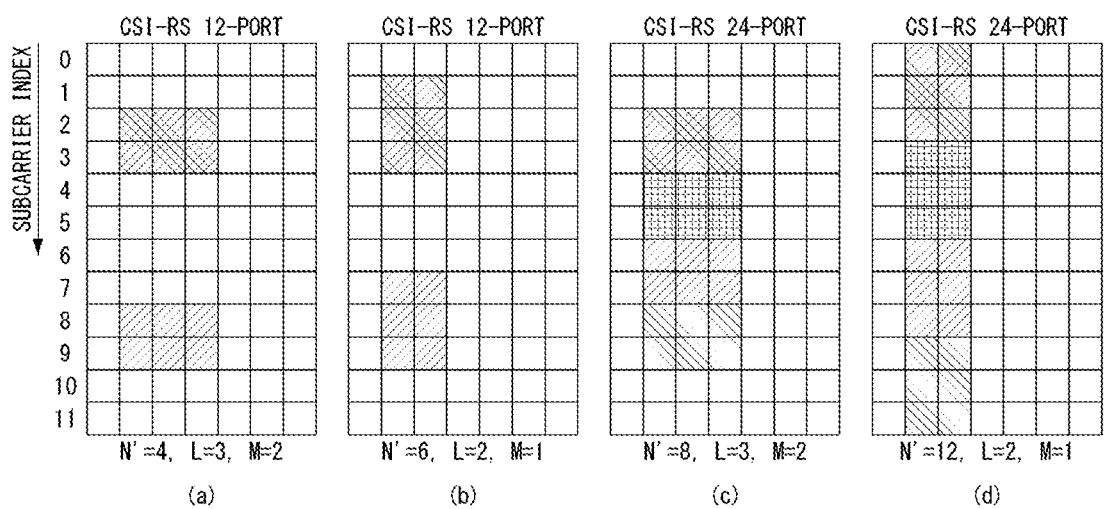
FIG. 32 is a diagram illustrating a CSI-RS pattern to which CDM-6 is applied according to an embodiment of the present invention.

FIG. 32 is a diagram illustrating a CSI-RS pattern to which CDM-6 is applied according to an embodiment of the present invention.

FIGS. 32(a) and 32(b) illustrate a 12-port CSI-RS pattern in one slot (in addition, one PRB) and FIGS. 32(c) and 32(d) illustrate a 24-port CSI-RS pattern in one slot (in addition, one PRB).

The CDM-6 may be considered as CDM implementation for optimization in N-port (e.g., N=12, 24) which is a multiple of 6. A scheme of configuring the CDM-6 may be configured as M=2 and this case may be applied in a similar scheme to description of the CDM-4.

As another embodiment, a scheme the CDM-6 may be configured as M=1 may also be used. In this case, when the CDM-6 is configured and M=1, the UE groups signaled REs into a specific subgroup (e.g., 6 REs) to configure the CDM-6. In this case, a CDM-6 pattern defined in advance may be used or the eNB may inform the UE of the CDM-6 pattern by explicit signaling. As an example of a weight vector to which the CDM-6 is applied, 6×6 (6 by 6) Discrete Fourier Transform (DFT) vectors may be used as shown in Equation 19 below.

$$W_0 = [1\ 1\ 1\ 1\ 1\ 1],$$
$$W_1 = \left[1\ \exp\left(\frac{2\pi j}{6}\right)\ \exp\left(\frac{2\pi j2}{6}\right)\ \exp\left(\frac{2\pi j3}{6}\right)\ \exp\left(\frac{2\pi j4}{6}\right)\ \exp\left(\frac{2\pi j5}{6}\right)\right],$$
$$W_2 = \left[1\ \exp\left(\frac{2\pi j2}{6}\right)\ \exp\left(\frac{2\pi j4}{6}\right)\ \exp\left(\frac{2\pi j6}{6}\right)\ \exp\left(\frac{2\pi j8}{6}\right)\ \exp\left(\frac{2\pi j10}{6}\right)\right],$$
$$W_3 = \left[1\ \exp\left(\frac{2\pi j3}{6}\right)\ \exp\left(\frac{2\pi j6}{6}\right)\ \exp\left(\frac{2\pi j9}{6}\right)\ \exp\left(\frac{2\pi j12}{6}\right)\ \exp\left(\frac{2\pi j15}{6}\right)\right],$$
$$W_4 = \left[1\ \exp\left(\frac{2\pi j4}{6}\right)\ \exp\left(\frac{2\pi j8}{6}\right)\ \exp\left(\frac{2\pi j12}{6}\right)\ \exp\left(\frac{2\pi j16}{6}\right)\ \exp\left(\frac{2\pi j20}{6}\right)\right],$$
$$W_2 = \left[1\ \exp\left(\frac{2\pi j5}{6}\right)\ \exp\left(\frac{2\pi j10}{6}\right)\ \exp\left(\frac{2\pi j15}{6}\right)\ \exp\left(\frac{2\pi j20}{6}\right)\ \exp\left(\frac{2\pi j25}{6}\right)\right]$$

[Equation 19]

Hereinafter, CDM-8 will be described.

FIG. 3 is a diagram illustrating a CSI-RS pattern to which CDM-8 is applied according to an embodiment of the present invention.

Figure 33:
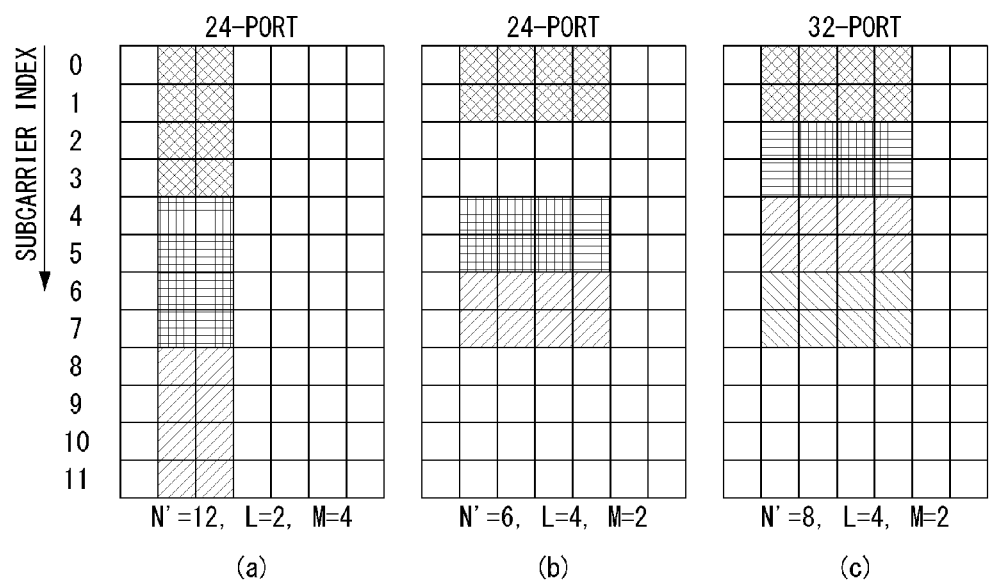
FIG. 33 is a diagram illustrating a CSI-RS pattern to which CDM-8 is applied according to an embodiment of the present invention.

FIGS. 33(a) and 33(b) illustrate a 24-port CSI-RS pattern in one slot (in addition, one PRB) and FIGS. 33(c) and 33(d) illustrate a 32-port CSI-RS pattern in one slot (in addition, one PRB).

The CDM-8 may be applied to 24-port and 32-port with a gain of the full power utilization.

The CDM-8 may be configured by using CDM-8 patterns of the CDM-TF as illustrated in FIG. 33(c). A scheme of configuring such a pattern may be configured according to the value (i.e., CSI-RS element) of M which is the basic unit of the CSI-RS similarly to the above description. That is, in the case of M=2, the CDM-8 pattern may be constituted by 2 by 4 (M by L) REs and a CDM-8 weight vector may be used. In the case of M=4, the CDM-8 pattern may be constituted by 4 by 2 (M by L) REs and the CDM-8 weight vector may be used.

In this case, as the signaling for the pattern, the eNB may signal to the UE information on the CDM-8 and M, L, and N information.

When the CDM pattern is configured over non-consecutive OSs, the inter-symbol spacing may be limited to 0 or 1 (i.e., s=0 or 1) to maximize the performance of the CDM-8. Alternatively, a value of s may be limited so as to configure the CDM pattern only in one slot. Alternatively, the UE may not expect that the CDM-8 is applied to the non-consecutive OSs.

As the example of the weight vector to which the CDM-8 is applied, the Walsh code shown in Equation 20 below may be used.

$W_0 = [1\ 1\ 1\ 1\ 1\ 1\ 1\ 1]$, $W_1 = [1\ 1\ 1\ 1\ -1\ -1\ -1\ -1]$, $W_2 = [1\ 1\ -1\ -1\ 1\ 1\ -1\ -1]$, $W_3 = [1\ 1\ -1\ -1\ -1\ -1\ 1\ 1]$, $W_4 = [1\ -1\ 1\ -1\ 1\ -1\ 1\ -1]$, $W_5 = [1\ -1\ 1\ -1\ -1\ 1\ -1\ 1]$, $W_6 = [1\ -1\ -1\ 1\ 1\ -1\ -1\ 1]$, $W_7 = [1\ -1\ -1\ 1\ -1\ 1\ 1\ -1]$, [Equation 20]

The eNB may signal to the UE information on each CDM (i.e., information indicating which CDM is applied) (e.g., information on CDM is not applied (No CDM), CDM-2, CDM-4, CDM-6, or CDM-8) or a subset thereof.

As described above, in terms of the performance of the CDM-x, it is preferable that the CDM-x is applied to the consecutive OSs so that CDM performance deterioration due to a sudden change of the channel does not occur. Accordingly, when the CDM-x is configured in the CDM-T or CDM-TF pattern over the time domain, the CSI-RS may be limited to be configured/applied only to y (in the case of the CDM-T, y=x and in the case of the CDM-TF, y represents a time domain value (or the number of OSs) in which the CDM-TF is spanned)) consecutive OSs. That is, the length or pattern of the CDM may be configured/applied according to the number of consecutive OSs. However, even in this case, as illustrated in FIG. 19(b), in the case where the CSI-RS is applied over four OSs, when two OSs are consecutive and two remaining OSs are consecutive, it is not limited that time domain CDM-2 or time-frequency (t by f) domain CDM-4 (2 by 2) or CDM-8 (2 by 4) is configured in each of two consecutive OSs.

Hereinafter, port numbering will be described.

In the case of port numbering, in order to maximize the performance of the channel estimation, it is desirable that the locations of REs to which CDM-x (e.g., x=2, 4, 8) are applied are positioned as close as possible in the same PRB.

As a result, in an embodiment of the present invention, the CSI-RS transmitted on the cross-polarization (X-pol) antenna port may be mapped to two same REs in M=2 and the CDM-2 may be applied. In this case, the unit to which the CDM-2 is applied may correspond to a port (i.e., a port mapped to a slant "/" and a slant "\") corresponding to an X-pol antenna.

The port numbering therefor is described below.

When the CDM-2 is applied for one X-pol antenna port group, when the N-port is constituted by a plurality of RE groups with M=2" (e.g., through an operation such as aggregation, etc.), the port numbering may be used. Further, since a codeword such as DFT, etc., is applied for each same polarization at the time of configuring the codebook, the port number of the N-port may be performed first in one polarization and then the port numbering may be performed in the remaining polarization.

Figure 34:
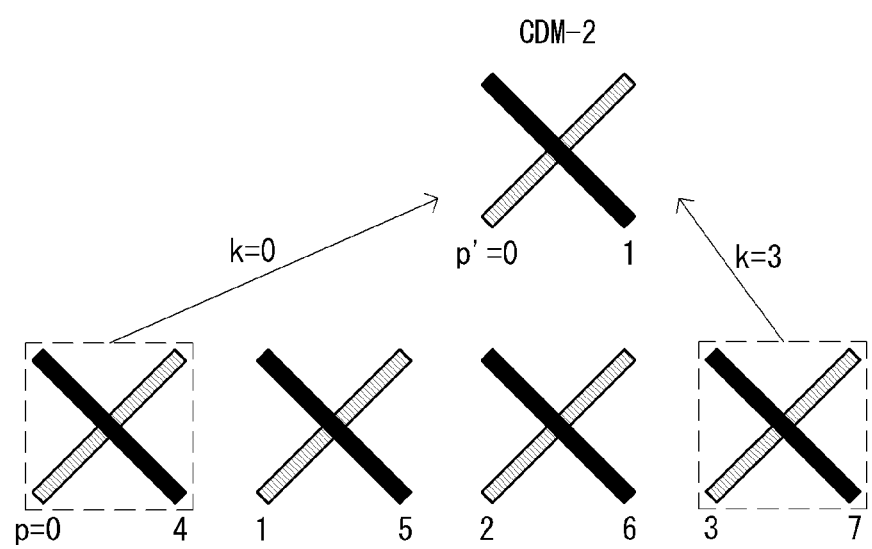
FIG. 34 is a diagram for describing a port numbering method according to an embodiment of the present invention.

FIG. 34 is a diagram for describing a port numbering method according to an embodiment of the present invention.

FIG. 34 illustrates a port numbering method for four REs with M=2 at the time of configuring the 8-port CSI-RS.

As described above, the CSI-RS may be mapped to M=2 RE in units of the X-pol antenna port and the CDM-2 may be applied. That is, the CSI-RSs on antenna port p=0 and antenna port p=4 may be mapped to two same REs and the CDM-2 may be applied. The CSI-RSs on antenna port p=1 and antenna port p=5 may be same two same REs and the CDM-2 may be applied. The CSI-RSs on antenna port p=2 and antenna port p=6 may be mapped to two same REs and the CDM-2 may be applied. The CSI-RSs on antenna port p=3 and antenna port p=7 may be mapped to two same REs and the CDM-2 may be applied.

Further, the port numbering may be performed in the order of 0, 1, 2, and 3 from the "/" slant antenna and the port numbering may be performed in the order of 4, 5, 6, and 7 from the "\" slant antenna port.

The port numbering method is shown in Equation 21 below.

$$\begin{cases} p = k + p' & \text{for } p' = 0 \\ p = \dfrac{N}{2} + k + p' - 1 & \text{for } p' = 1 \end{cases} \quad \text{[Equation 21]}$$

$$\text{where } k = 0, 1, \ldots \dfrac{N}{2} - 1$$

In Equation 21, p' represents port numbers of tow ports to which the CDM-2 is applied. For ease of expression, p'={0, 1} may be assumed and for example, in the case of the LTE, p'={15, 16} may be expressed. Further, k represents the number of RE groups with M=2 at the time of configuring the N-port through the operation such as the aggregation, etc.

In the case of the CDM-4, a case where the CDM-4 is applied to two RE groups with M=2 may be considered. Accordingly, in the case the UE configured as the CDM-4, a number index k of RE groups with M=2 constituting the N-port is divided into two groups (in the above example, {0,1}, {2,3}, . . . , $$\left\{ \dfrac{N}{2} - 2, \dfrac{N}{3} - 1 \right\} )$$

to apply the CDM-4 to corresponding port number p per k groups.

According to the example of FIG. 34 above, the CDM-4 may be applied to a port group of {0, 1, 4, 5} and the CDM-4 may be applied to a port group of {2, 3, 6, 7}. That is, in Equation 15 configuring the CDM-4 described above, a first matrix represents a CDM-2 value depending on each k value and a second matrix means CDM-2 applied to two k values.

Even in the case of the CDM-8, the number index k of RE groups with M=2 constituting the N-port may be divided into four groups in the case of M=2A and in the above example, the CDM-8 may be applied to port number p corresponding to {0, 1, 2, 3}, . . . , $$\left\{\frac{N}{2}-4, \frac{N}{2}-3, \frac{N}{2}-2, \frac{N}{2}-1\right\}.$$

In the case of M=4, the port numbering may extend Equation 21 above and extend Equation 21 to Equation 22 below.

$$\begin{cases} p = \frac{M}{2}k + p' & \text{for } p' = 0, 1 \\ p = \frac{N}{2} + \frac{M}{2}k + p' - 1 & \text{for } p' = 2, 3 \end{cases} \quad \text{[Equation 22]}$$

$$\text{where } k = 0, 1, \ldots \frac{N}{M} - 1$$

Even in the case of M=8, as a range of p', 0, 1, 2, 3/4, 5, 6, 7 may be used.

In this case, in the case of the CDM-2, a p' index may be configured by {i and i+N/2} (here, i=0, 1 or 0, 1, 2, 3). In the case of the port numbering, the CDM-2 is applied in units of X-pol and higher order CDM, i.e., CDM-4 and CDM-8 are configured by aggregating x-pol which is the CDM-2 unit.

k which is the number index of RE groups with M=4 in which the CDM-4 is applied in units of the port to which REs with M=4 are mapped in the case of the CDM-4 and to which the CDM-4 is applied in the case of the CDM-8 may be divided into two groups and in the above example, the CDM-8 may be applied to port number p corresponding to {0,1}, {2,3}, . . . , $$\left\{\frac{N}{2}-2, \frac{N}{2}-1\right\}.$$

In the case of M=8, the CDM-8 may be configured/applied in units of the port to which REs with M=8 are mapped.

Hereinafter, a CSI-RS density will be described.

In the case of the CSI-RS density, the unit may be represented by the RE/RB/port. The CSI-RS density considered in the LTE uses 1 RE/RB/port to guarantee channel estimation performance. Further, as the number of ports supported in release (Rel)-14 increases, when for example, the 32-port is mapped in 40 REs allocated for the CSI-RS, a disadvantage occurs in that only one cell reuse factor may be achieved.

In order to solve such a disadvantage, a scheme of using a reduced density, i.e., a lower density such as d=1/2 (RE/RB/port), d=1/3 (RE/RB/port), etc., is proposed. For example, in the case of the 1/2 density, among 32 ports, a Comb Type transmission of a scheme of transmitting 16 ports to even RBs and remaining 16 ports to odd RBs is supported. In order to support the lower density, the eNB may configure the density value for the UE over the higher layer signaling (e.g., RRC signaling or MAC CE) even in the NR and in a plurality of CSI-RS patterns corresponding to M value and CDM value constituting the N-port, the CSI-RS may be transmitted in schemes in which different periods and offsets are configured, respectively.

Further, when a delay spread is large, CSI-RS estimation performance may not be sufficient with the density of 1 RE/RB/port and to this end, a method for increasing the density may be considered. To this end, the eNB may inform the UE of d={2, 3, 6} which is an additional density value.

In this case, the UE expects CSI-RS transmission at a period (i.e., a subcarrier spacing of 12/d) of 12/d (subcarrier) and does not expect that the CSI-RS pattern is configured, which exceeds the subcarrier index of 12/d.

For example, in the case of the UE configured as d=2, a space in which an available pattern for the CSI-RS transmission by the UE is spanned, the subcarrier index may be limited to #0 to #5 and as the CSI-RS patterns of REs #6 to #11, CSI-RS patterns #0 to #5 may be copied and used.

Further, if numerology (e.g., subcarrier spacing, etc.) is changed, the UE may assume a default CSI-RS density as 1 RE/RB/port.

Hereinafter, a priority rule will be described.

In the system such as the NR, when another reference signal (e.g., DMRS or phase-tracking reference signal (PTRS) other than the CSI-RS is transmitted in the same slot, a collision may occur between the RSs. In order to prevent such a situation, an embodiment of the present invention proposes a CSI-RS design scheme and a collision priority rule.

When the performance of the DMRS deteriorates due to Doppler, a symbol may be configured in which additional DMRS (i.e., other than front loaded DMRS) is transmitted in order to overcome the deterioration of the performance. In this case, a CDM length/pattern may be limited to be configured so that the CSI-RS is transmitted to an OS (OS after the OS in which the additional DMRS is transmitted) which is larger than the location of the OS in which the additional DMRS is transmitted.

Further, when the CSI-RS is configured in such a scheme, when the number of OSs in which the CSI-RS may be configured is larger than the length of the OS in which the CSI-RS needs to be configured for the UE, the CSI-RS may be limited to be configured in a scheme of d<1 such as the RB level Comb type transmission described above. For example, it is assumed that the number of OSs in the slot is 14, the CSI-RS port to be transmitted to the corresponding UE is 32, and the additional DMRS is positioned in OS #11. In this case, since a location in which the CSI-RS may be transmitted is OSs 12 and 13, the 32-port CSI-RS may be transmitted over 4 consecutive OSs like the design described above. Accordingly, in this case, the CSI-RS may be configured for the UE with d=1/2 (a scheme of transmitting 16 ports to even RBs and remaining 16 ports to odd RBs).

Further, when additional DMRS is configured, the CSI-RS may be configured/applied to non-consecutive OSs. That is, the eNB configures the interval (i.e., the parameter s value) between the OSs to be larger than the length of the additional DMRS to prevent the collision between reference signals.

Further, the collision between the CSI-RS and another reference signal may be prevented by the following method.

Figure 35:
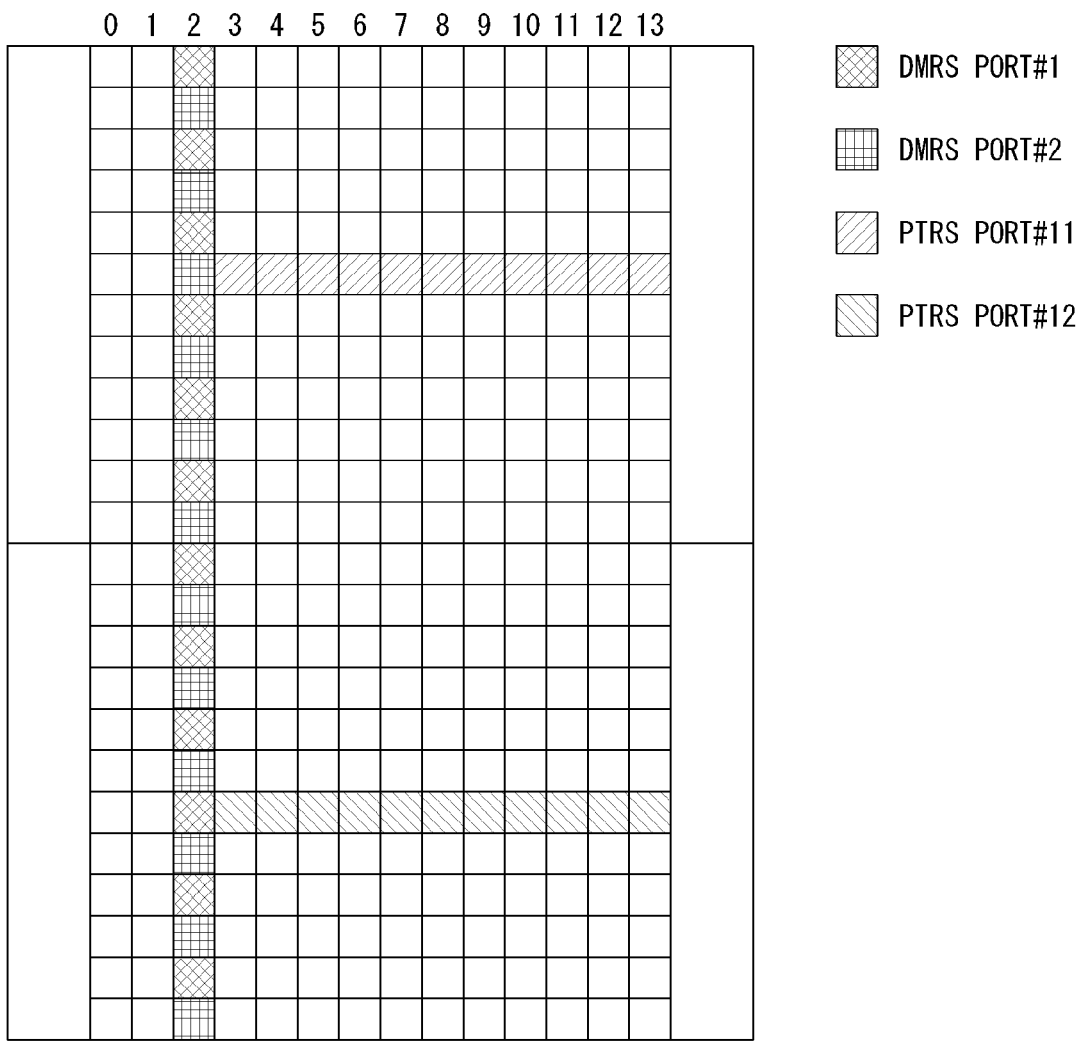
FIG. 35 is a diagram illustrating a reference signal according to an embodiment of the present invention.

FIG. 35 is a diagram illustrating a reference signal according to an embodiment of the present invention.

FIG. 35 illustrates DMRS and PTRS mapping in one slot (in addition, two PRBs).

Referring to FIG. 35, the PTRS may be consecutively transmitted to a specific subcarrier in one slot/RB in the time domain in order to compensate phase noise.

In this case, when the CSI-RS completely occupies one OS, the collision with the PTRS is inevitable. Accordingly, in order to prevent the collision with the PTRS, the CSI-RS may be configured to be transmitted in the RE or RB-level Comb type and limited to configure the offset so as to prevent the collision with the PTRS.

Further, the following priority rule may be considered in order to prevent the collision between the CSI-RS and another reference signal.

a. DMRS>PTRS>CSI-RS: That is, when the reference signals collide with each other, RSs having a low priority are dropped (i.e., not transmitted) according to the priority.

b. When aperiodic CSI is configured, the priority of the CSI-RS and the PTRS may be exceptionally as CSI-RS>PTRS. The reason is that in the case of the aperiodic CSI as compared with periodic reporting and in particular when the number of ports is small, if information corresponding to one port is dropped due to the collision, it is difficult to estimate the CSI.

Figure 36:
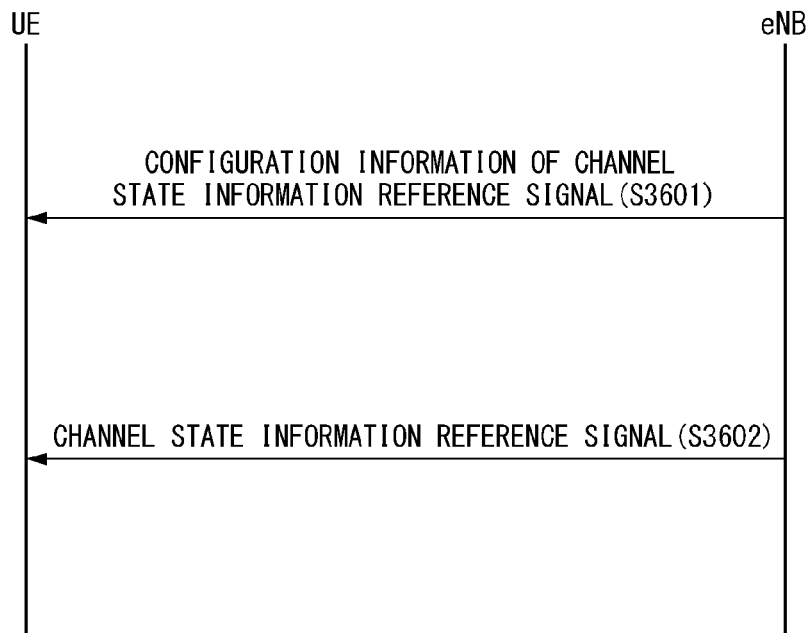
FIG. 36 is a diagram illustrating a method for transmitting and receiving a channel state information reference signal according to an embodiment of the present invention.

FIG. 36 is a diagram illustrating a method for transmitting and receiving a channel state information reference signal according to an embodiment of the present invention.

Referring to FIG. 36, the UE receives configuration information of a channel state information reference signal (CSI-RS) from the eNB (S3601).

Here, the configuration information of the CSI-RS may be transmitted through the higher layer signaling (e.g., RRC signaling or MAC CE).

The position of an orthogonal frequency division multiplexing (OFDM) symbol for transmitting the CSI-RS may be configured by the configuration information of the CSI-RS. In particular, when the CSI-RS is transmitted in a non-consecutive OFDM symbol, a plurality of OFDM symbols for transmission of the CSI-RS may be explicitly configured by the configuration information of the CSI-RS through the higher layer signaling (e.g., RRC signaling or MAC CE).

Further, the position of a resource element (RE) for transmitting the CSI-RS may be determined by M RE units (M is 1 and/or 2 and/or 4 and/or 8) and in this case, the M value may be configured by the configuration information of the CSI-RS.

Further, the CSI-RS through M antenna ports is subjected to code division multiplexing (CDM-M) by the M RE units. However, in the case of M=1, CDM may not be applied for CSI-RS transmission.

Further, the CDM pattern ma be configured by the configuration information of the CSI-RS and in this case, the CDM pattern as a CDM scheme applied by M RE units may indicate any one of frequency domain CDM (CDM-F), time domain CDM (CDM-T), or frequency and time domain CDM (CDM-TF).

Here, when CDM-4 is applied by 4 RE units, time/frequency domain CDM-2 and frequency/time domain CDM-2 are combined to apply the CDM-4 to the 4 RE units. Further, when CDM-8 is applied by 8 RE units, time/frequency domain CDM-2 and frequency/time domain CDM-4 are combined to apply the CDM-8 to the 8 RE units.

Further, the density d value of the CSI-RS may be configured by the configuration information of the CSI-RS and in this case, when d is larger than 1 (e.g., 3), the CSI-RS may be transmitted at a subcarrier spacing of 12/d.

The UE receives from the eNB the channel state information reference signal (CSI-RS) through one or more antenna ports (S3602).

The CSI-RS may be transmitted according to the method illustrated (described) in FIGS. 19 to 35 above and a detailed description thereof will be omitted.

Meanwhile, as described above, the priority may be assigned among reference signals including DMRS>PTRS>CSI-RS and the CSI-RS may not be transmitted (may be dropped) in the RE duplicated with the DMRS (or PTRS).

The UE may measure the CSI-RS received in step S3602 and report channel state information (e.g., CQI, PMI, PTI, RI, etc.) to the eNB.

Overview of Devices to which Present Invention is Applicable

Figure 37:
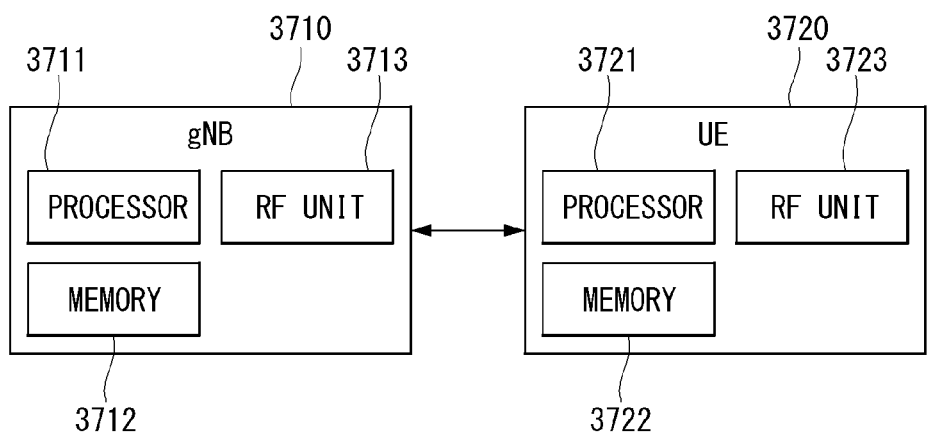
FIG. 37 illustrates a block diagram of a wireless communication device according to an embodiment of the present invention.

FIG. 37 illustrates a block diagram of a wireless communication device according to an embodiment of the present invention.

Referring to FIG. 37, a wireless communication system includes an eNB 3710 and multiple UEs 3710 positioned within an area of the eNB 3720.

The eNB 3710 includes a processor 3711, a memory 3712, and a radio frequency (RF) unit 3713 (or transceiver). The processor 3711 implements a function, a process, and/or a method which are proposed in FIGS. 1 to 36 above. The layers of the wireless interface protocol may be implemented by the processor 3711. The memory 3712 is connected with the processor 3711 to store various pieces of information for driving the processor 3711. The RF unit 3713 is connected with the processor 3711 to transmit and/or receive a radio signal.

The UE 3720 includes a processor 3721, a memory 3722, and an RF unit 3723 (or transceiver). The processor 3721 implements a function, a process, and/or a method which are proposed in FIGS. 1 to 36 above. The layers of the wireless interface protocol may be implemented by the processor 3721. The memory 3722 is connected with the processor 3721 to store various pieces of information for driving the processor 3721. The RF unit 3723 is connected with the processor 3721 to transmit and/or receive a radio signal.

The memories 3712 and 3722 may be positioned inside or outside the processors 3711 and 3721 and connected with the processors 3711 and 3721 by various well-known means. Further, the base station 3710 and/or the UE 3720 may have a single antenna or multiple antennas.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

An example is applied to the 3GPP LTE/LTE-A system is described primarily, but it is possible to apply the RRC connection method to various wireless communication systems (e.g., 5 generation (G)) system in addition to the 3GPP LTE/LTE-A system.

The invention claimed is:

1. A method of transmitting, by a base station, a channel state information-reference signal (CSI-RS) in a wireless communication system, the method comprising:
   transmitting configuration information of the CSI-RS to user equipment (UE); and
   transmitting, to the UE, the CSI-RS through one or more antenna ports,
   wherein a position of at least a first orthogonal frequency division multiplexing (OFDM) symbol and/or a second OFDM symbol among one or more OFDM symbols for transmitting the CSI-RS is configured by the configuration information, and
   wherein a position of one or more resource elements (REs) for transmitting the CSI-RS through each of the one or more antenna ports is determined by a unit of M RE, where M is one of 1, 2, 4, 8 based on the position of the first OFDM symbol and/or the second OFDM symbol.

2. The method of claim 1, wherein the M value is configured by the configuration information.

3. The method of claim 1, wherein the CSI-RS is transmitted by applying code division multiplexing (CDM) in a unit of the M RE.

4. The method of claim 3, wherein the configuration information includes information on a pattern of the CDM, and
   wherein the information on the pattern of the CDM includes information on whether a domain to which the CDM is applied is a time domain, a frequency domain, and/or a time-frequency domain.

5. The method of claim 4, wherein the information on the pattern of the CDM includes information of a size of the unit of the M RE to which the CDM is applied.

6. The method of claim 3, wherein based on that a size of the unit of the M RE to which the CDM is applied is 4 REs, time/frequency domain CDM by 2 REs and frequency/time domain CDM by 2 REs are combined to apply the CDM to the 4 REs.

7. The method of claim 3, wherein based on that a size of the unit of the M RE to which the CDM is applied is 8 REs, time/frequency domain CDM by 2 REs and frequency/time domain CDM-4 by 4 REs are combined to apply the CDM to the 8 REs.

8. The method of claim 1, wherein based on that a size of the unit of the M RE to is 1 RE, code division multiplexing (CDM) is not applied for transmitting the CSI-RS.

9. The method of claim 1, wherein a density d value of the CSI-RS is configured by the configuration information.

10. The method of claim 1, wherein the CSI-RS is not transmitted in one or more REs overlapped with a demodulation reference signal (DMRS).

11. A method for receiving, by user equipment (UE), a channel state information-reference signal in a wireless communication system, the method comprising:
    receiving, from a base station, configuration information of the CSI-RS; and
    receiving, from the base station, the CSI-RS through one or more antenna ports,
    wherein a position of at least of first orthogonal frequency division multiplexing (OFDM) symbol and/or a second OFDM symbol among one or more OFDM symbols for transmitting the CSI-RS is configured by the configuration information, and
    wherein a position of one or more resource elements (REs) for transmitting the CSI-RS through each of the one or more antenna ports is determined by a unit of M RE, where M is one of 1, 2, 4, 8, based on the position of the first OFDM symbol and/or the second OFDM symbol.

* * * * *